US008676736B2

(12) United States Patent
Piłászy et al.

(10) Patent No.: US 8,676,736 B2
(45) Date of Patent: Mar. 18, 2014

(54) RECOMMENDER SYSTEMS AND METHODS USING MODIFIED ALTERNATING LEAST SQUARES ALGORITHM

(75) Inventors: István Piłászy, Balatonkenese (HU); Domonkos Tikk, Budapest (HU); Gábor Takács, Győr (HU); András Németh Bottyán, Győr (HU); Dávid Zibriczky, Nagykanizsa (HU)

(73) Assignee: Gravity Research and Development Kft., Budapest (HU)

( * ) Notice: Subject to any disclaimer, the term of this patent is extended or adjusted under 35 U.S.C. 154(b) by 182 days.

(21) Appl. No.: 13/194,318

(22) Filed: Jul. 29, 2011

(65) Prior Publication Data

US 2012/0030159 A1    Feb. 2, 2012

Related U.S. Application Data

(60) Provisional application No. 61/369,095, filed on Jul. 30, 2010.

(51) Int. Cl.
| *G06F 17/00* | (2006.01) |
| *G06F 7/00* | (2006.01) |
| *G06N 5/04* | (2006.01) |
| *G06F 17/30* | (2006.01) |

(52) U.S. Cl.
CPC ............ *G06N 5/04* (2013.01); *G06F 17/30864* (2013.01)
USPC ........................................... 706/46; 707/758

(58) Field of Classification Search
None
See application file for complete search history.

(56) References Cited

U.S. PATENT DOCUMENTS

| 2004/0076936 | A1* | 4/2004 | Horvitz et al. ................. 434/236 |
| 2009/0083258 | A1* | 3/2009 | Koren et al. ....................... 707/5 |
| 2009/0307296 | A1* | 12/2009 | Gibbs et al. .................... 709/201 |
| 2012/0023045 | A1* | 1/2012 | Steck .............................. 706/12 |
| 2012/0096009 | A1* | 4/2012 | Scholz et al. ................. 707/748 |
| 2012/0330777 | A1* | 12/2012 | Sathish et al. ............... 705/26.7 |

* cited by examiner

*Primary Examiner* — Alan Chen
(74) *Attorney, Agent, or Firm* — Fitch, Even, Tabin & Flannery LLP

(57) ABSTRACT

A system and method of providing personalized item recommendations in a communication system comprising a server and a plurality of client devices. At the server, a plurality of user rating vectors are received from a plurality of client devices and aggregated into a rating matrix that is factorized into a user feature matrix and an item feature matrix, with the product of the user feature and item feature matrixes approximating the user rating matrix. The factorization comprises the steps of the ALS1 or the IALS1 algorithm including: initializing the user feature matrix and the item feature matrix with predefined initial values; alternately optimizing the user feature matrix and the item feature matrix until a termination condition is met. The item feature matrix is transmitted from the server to at least one client device, and a predictive rating vector is generated as the product of the associated user feature vector and the item feature matrix. At least one item is selected for recommendation to a user from the items associated with the predictive rating vector.

37 Claims, 4 Drawing Sheets

RECOMMENDER SYSTEMS AND METHODS USING MODIFIED ALTERNATING LEAST SQUARES ALGORITHM

Cross-Reference To Related Application

The present application claims the priority of Provisional Patent Application No. 61/369,095, filed Jul. 30, 2010, the subject matter of which, in its entirety, is incorporated herein by reference.

BACKGROUND OF THE INVENTION

1. Field of the Invention

The present invention relates generally to the field of personalized content provision through the application of a recommender system. In particular, the invention provides effective and robust algorithms to be implemented as engines of recommender systems in various peculiar fields.

2. Background Art

Currently, there is a huge amount of media content, such as audios, videos, or graphics, available from a variety of sources. In particular, such media content may include digital graphics, music, films, movies, broadcast television programs, cable or satellite television programs, home movies, user-created video clips, personal photographs, etc. These contents are stored in many repositories and databases from which people can select and obtain the desired media content. The amount of media content accessible by the users grows rapidly day by day. Furthermore the Internet also broadens the horizon for many other types of businesses. By conducting transactions online, businesses are able to sell their products (or services) to customers all around the world. At the same time, businesses are able to offer much greater variety of products since they are no longer restricted by the spaces available in their physical stores.

With such a great amount of available products, services and media contents, business entities, especially online businesses, often wish to recommend their products or services to users or prospective clients, because these businesses typically offer very large numbers of products or services at their websites and consequently, it is unlikely for individual users or clients to browse through all available products or services personally.

Businesses usually try to make such item recommendations personally tailored to individual users or customers as much as possible, since what may be interesting to one customer may not be interesting to another customer. In order to make personalized item recommendations, collection of various types of information concerning the individual users or customers is needed in order to determine what a particular user may or may not like.

Presently, one of the most common techniques for making personalized item recommendations is the so called collaborative filtering, which is a process of filtering for information or patterns using techniques involving collaboration among multiple agents, viewpoints, data sources, etc. In the case of applying collaborative filtering to making personalized item recommendations, the collaboration is among the users or customers and the available products, service and media contents of a system. Typically, known information is collected from the users and aggregated at a centralized location, such as a server. Patterns, such as similarities between two or more users or similarities between two or more items, among the collected data are located and used as the basis for making recommendations. Consequently, information that may be used to identify individual users and/or client devices associated with the users are also collected by the recommender system, since the system needs to be aware of each user's personal profile in order to personalize the recommendations for a particular user.

Personalization of content is one of the most active research areas nowadays. In case of personalized content provision, users not only project their personal characteristics on information, but actually receive what they actually are interested in. Hence, users should be provided with content—as well as navigational tools—that match their individual traits and preferred (consciously or not) ways of receiving and processing information.

By way of mapping a user's behaviour, a recommender system becomes able to create the range/profile of interest of the user. Then, a provider can offer such novel content to the user which matches the user's interest. As a result of this, the user will subscribe more easily to (or at least require more information on) the content offered by the provider. In order to reach targeted users in a more personalized manner, hence, there is a need for enhancing the quality of recommendation.

The quality of recommendation is of great importance, as a recommendation of bad quality might have an adverse effect: the user simply neglects the offer or in more severe cases she/he looks for a different offer of another provider. This clearly leads to disadvantages, in terms of either revenue or appreciation of the provider.

The purpose of recommender systems applied varies from field to field, since providers with interests in different fields have got highly different business models to be accomplished. In particular, for a news portal, maximizing the time spent by the user with reading the articles presented in a given domain of the portal is the major object, since the provider's income might basically depend on the number of on-line ads actually read/visited by the user. In turn, for an e-business selling typically e.g. electronic devices, the most important aim is to generate as large business, and hence profit, as is possible.

In recommender systems using collaborative filtering to obtain information from users to create a user profile for each user, one of the widely used techniques is matrix factorization, which is an efficient tool to make personalized recommendations of items, such as products, services or media content, while preserving complete user privacy.

For example, U.S. Pat. No. 7,685,232 discloses an item recommender system based on collaborative filtering, wherein a rating matrix is generated at a server from the rating vectors received from the users, more particularly from client devices operated by the users. In the rating matrix, the rows correspond to a plurality of users, whereas the columns correspond to a plurality of items, each of the cells representing a rating value associated with a corresponding item for a corresponding user. The rating matrix is then approximated by the product of a user feature matrix and an item feature matrix (this operation is also referred to as factorization of the rating matrix) and the item feature matrix is then transmitted to selected ones of a plurality of client devices associated with the plurality of users. At a selected client device a user feature vector is calculated, by means of approximation, from the item feature matrix and the rating vector available in the client device, wherein each of the cells of the rating vector represents a predicted rating value for a particular item to be recommended to the corresponding user. This method has the drawback that an additional approximation is to be performed in each client device to determine the user feature vector, which in case of large data sets, requires a substantial computational power in the client devices.

The paper by R. M. Bell and Y. Koren, entitled "*Scalable collaborative filtering with jointly derived neighborhood interpolation weights*" (ICDM-07, 7$^{th}$ IEEE Int. Conf. on Data Mining, pages 43-52, Omaha, Nebr., USA, 2007) introduces an efficient method for matrix factorization. The alternating least squares (ALS) method disclosed in this paper is a powerful matrix factorization (MF) algorithm for both explicit and implicit feedback based recommender systems. As shown in many articles, increasing the number of latent factors (denoted by K) boosts the prediction accuracy of MF based recommender systems, including ALS as well. The price of the better accuracy is paid by the increased running time: the running time of the original version of ALS is proportional to $K^a$. Yet, the running time of model building can be important in recommender systems; if the model cannot keep up with the changing item portfolio and/or user profile, the prediction accuracy can be degraded.

An ALS variant for implicit feedback datasets (from now on IALS) is published in the paper by Y. Hu, Y. Koren, and C. Volinsky, entitled "*Collaborative filtering for implicit feedback datasets*" (ICDM-08, $8^{th}$ IEEE Int. Conf. on Data Mining, pages 263-272, Pisa, Italy, 2008).

Both of the above mentioned ALS and IALS method exhibits a computational complexity that is proportional to the cubic factor of the number of latent factors, which, in case of a huge number of users and items, might result in unreasonable computing time. Such a high computational requirement, in turn, provides a limitation on the frequency of updating the item feature matrix and user feature vectors according to the continuously changing user ratings.

It is therefore an object of the present invention to provide an item recommendation method and system that eliminate the above mentioned deficiencies of the prior art solutions by significantly reducing the computational requirements for the matrix factorization. This allows either to recalculate the item feature matrix and the user feature vectors from the rating matrix at a much higher frequency, or to provide a much more accurate prediction model including a higher number of latent factors, with using the same updating frequency for the item feature matrix and the user feature vector.

SUMMARY OF THE INVENTION

In a first aspect, the present invention relates to a method of providing personalized item recommendations in a communication system comprising a server and a plurality of client devices, the method comprising at the server, receiving a plurality of user rating vectors $r_u$, from a plurality of said client devices, at the server, aggregating the user rating vectors $r_u$ into a rating matrix R, at the server, factorizing said rating matrix R into a user feature matrix P and an item feature matrix Q, wherein the product $\hat{R}$ of said user feature matrix P and said item feature matrix Q approximates the user rating matrix R, said factorization comprising the steps of:

initializing said user feature matrix P and said item feature matrix Q with predefined initial values, alternately optimizing said user feature matrix P and said item feature matrix Q until a termination condition is met, wherein (i) in a P-step, a cost function $$F(p_u) = \lambda p_u^T p_u + \sum_{i=1}^{M} \Box c_{ui}(p_u^T q_i - r_{ui})^2$$

is minimized for each user feature vector $p_u$ of said user feature matrix P with a fixed item feature matrix Q, and (ii) in a Q-step, a cost function $$F(q_i) = \lambda q_i^T q_i + \sum_{i=1}^{N} \Box c_{ui}(p_u^T q_i - r_{ui})^2$$

is minimized for each item feature vector $q_i$ of said item feature matrix Q with a fixed user feature matrix P, wherein $\lambda$ is a preset regularization factor, $c_{ui}$ is a confidence value with respect to user u and item i, and $r_{ui}$ is the rating value for an item i evaluated by a user u, wherein in each of the P-steps, each scalar element of $p_u$ is computed from all other scalar elements of $p_u$ and the fixed matrix Q, and similarly, in each of the Q-steps, each scalar element of $q_i$, is computed from all other scalar elements of $q_i$ and the fixed matrix P, and, transmitting, from the server, said item feature matrix Q to at least one client device, generating a predictive rating vector $\hat{r}_u$, as the product of the associated user feature vector $p_u$ and the item feature matrix Q, and by using a predefined selection scheme, selecting at least one item for recommendation to user from the items associated with the predictive rating vector $\hat{r}_u$.

In a second aspect, the present invention relates to a method of providing personalized item recommendations in a communication system comprising a server and a plurality of client devices, the method comprising at the server, receiving a plurality of user rating vectors $r_u$ from a plurality of said client devices, at the server, aggregating the user rating vectors $r_u$ into a rating matrix R, transmitting, from the server, said rating matrix R to at least one client device, at a client device, factorizing said rating matrix R into a user feature matrix P and an item feature matrix Q, wherein the product $\hat{R}$ of said user feature matrix P and said item feature matrix Q approximates the user rating matrix R, said factorization comprising initializing said user feature matrix P and said item feature matrix Q with predefined initial values, alternately optimizing said user feature matrix P and said item feature matrix Q until a termination condition is met, wherein (i) in a P-step, a cost function $$F(p_u) = \lambda p_u^T p_u + \sum_{i=1}^{M} \Box c_{ui}(p_u^T q_i - r_{ui})^2$$

is minimized for each user feature vector $p_u$ of said user feature matrix P with a fixed item feature matrix Q, and (ii) in a Q-step, a cost function $$F(q_i) = \lambda q_i^T q_i + \sum_{i=1}^{N} \Box c_{ui}(p_u^T q_i - r_{ui})^2$$

is minimized for each item feature vector $q_i$ of said item feature matrix Q with a fixed user feature matrix P, wherein λ is a preset regularization factor, $c_{ui}$ is a confidence value with respect to user u and item i, and $r_{ui}$ is the rating value for an item i evaluated by a user u, and wherein in each of the P-steps, each scalar element of $p_u$ is computed from all other scalar elements of $p_u$ and the fixed matrix Q, and similarly, in each of the Q-steps, each scalar element of $q_i$ is computed from all other scalar elements of $q_i$ and the fixed matrix P, generating a predictive rating vector $\hat{r}_u$ as the product of the associated user feature vector $p_u$ and the item feature matrix Q, and by using a predefined selection scheme, selecting at least one item for recommendation to user from the items associated with the predictive rating vector $\hat{r}_u$.

In a third aspect, the present invention relates to a server for providing personalized item recommendations in a communication system to a plurality of users associated with a plurality of client devices, the server comprising means for receiving a plurality of user rating vectors $r_u$ from a plurality of client devices, means for aggregating said plurality of user rating vectors $r_u$ into a rating matrix R, means for factorizing said rating matrix R into a user feature matrix P and an item feature matrix Q, wherein the product $\hat{R}$ of said user feature matrix P and said item feature matrix Q approximates the user rating matrix R, said factorization comprising initializing said user feature matrix P and said item feature matrix Q with predefined initial values, alternately optimizing said user feature matrix P and said item feature matrix Q until a termination condition is met, wherein (i) in a P-step, a cost function $$F(p_u) = \lambda p_u^T p_u + \sum_{i=1}^{M} \square c_{ui}(p_u^T q_i - r_{ui})^2$$

is minimized for each user feature vector $p_u$ of said user feature matrix P with a fixed item feature matrix Q, and (ii) in a Q-step, a cost function $$F(q_i) = \lambda q_i^T q_i + \sum_{i=1}^{N} \square c_{ui}(p_u^T q_i - r_{ui})^2$$

is minimized for each item feature vector $q_i$ of said item feature matrix Q with a fixed user feature matrix P, wherein λ is a preset regularization factor, $c_{ui}$ is a confidence value with respect to user u and item i, and $r_{ui}$ is the rating value for an item i evaluated by a user u, and wherein in each of the P-steps, each scalar element of $p_u$ is computed from all other scalar elements of $p_u$ and the fixed matrix Q, and similarly, in each of the Q-steps, each scalar element of $q_i$ is computed from all other scalar elements of $q_i$ and the fixed matrix P, and means for transmitting said item feature matrix Q to at least one client device.

In a fourth aspect, the present invention relates to a system for providing personalized item recommendations to a plurality of users in a communication system, comprising:

a server as defined above, and a plurality of client devices, each one of said client devices being adapted for generating a predictive rating vector $\hat{r}_u$, for each selected user u associated with said selected client devices, said predictive rating vector $\hat{r}_u$ being the product of the user feature vector $p_u$ and the item feature matrix Q, and selecting, according to a predefined selection scheme, a plurality of items from the entire set of items included in the predictive rating vector $\hat{r}_u$ for the recommendation thereof to said particular user u associated with the predictive rating vector $\hat{r}_u$, and a communication interconnection for interconnecting said server and said client devices.

In a fifth aspect, the present invention relates to a computer program product for providing personalized item recommendations to a plurality of users, the computer program product comprising a computer-readable medium having a plurality of computer program instructions stored therein, which are operable to cause at least one server and a plurality of client devices to carry out the respective steps of the first method according to the invention.

BRIEF DESCRIPTION OF THE DRAWINGS

The present invention will now be described in more detail through non-limiting preferred embodiments thereof with reference to the accompanying drawings, in which.

DETAILED DESCRIPTION OF THE INVENTION

Figure 1:
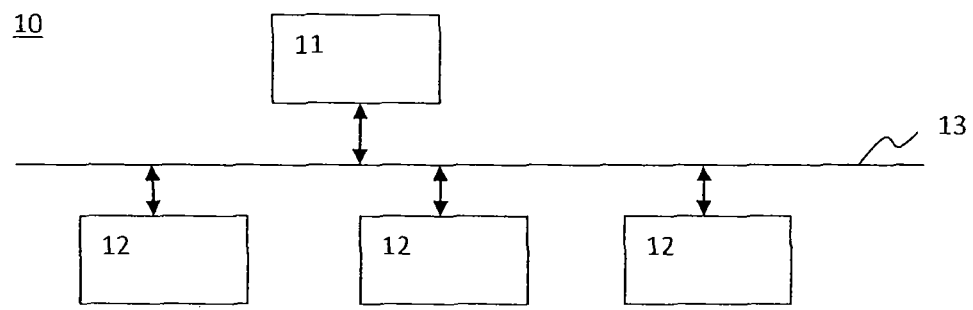
FIG. 1 is a schematic block diagram of the item recommender system according to a first embodiment of the invention.

Recommender systems suggest personalized recommendations on items to users based on various kinds of information on users and items. Recommender systems intend to model user preferences on items and aim to recommend such items the user will probably like. User preference information is twofold: explicit and implicit feedback. The former mainly includes opinion expression via ratings of items on a predefined scale, while the latter consists of other user activities, such as purchasing, viewing, renting or searching of items.

The commercial applications of recommender systems have the ultimate goal of profit maximization. However, due to business reasons revenue data are hardly available, therefore in the scientific context one may optimize recommender algorithms for such performance measures that supposedly correlate well with the business goals. For this purpose error measures are typically applied, such as the root mean square error (RMSE) or the mean absolute error (MAE). Another alternative is the ranking based average relative position (ARP, we define it later).

Most recommendation algorithms exhibit such parameter(s) that enable a complexity—accuracy trade-off. In case of latent factor models, e.g. matrix factorization based algorithms, the most important parameter of the model is the number of latent factors. For neighborhood-based models the number of neighbors considered affects the complexity of a model the most. As it was shown in numerous prior art publications, the higher its complexity, the more accurate the model. On the other hand, the more complex the model, the higher its training time is. Albeit the accuracy is a prominently important feature of recommender systems, it is equally important that the model is computable under a reasonable amount of time; here the time constraint obviously depends on the application domain.

The faster training time of an algorithm, allowing for various running time—accuracy trade-off scenarios, can be exploited in commercial applications in several ways. First, services with typically short item lifetime—such as news feeds, auction portals, non-repetitive cultural events—require frequent periodical retraining of the recommendation model otherwise the model becomes outdated and inaccurate. The incremental update of the recommendation model with interactions on new items offers only a temporal solution, because this technique does not handle item-item relations. Similarly, but in much less extent, the user profiles can also be eroded with time. A faster algorithm enables more frequent retraining and constantly higher recommendation quality at the same hardware cost. Second, faster training time enables to build a better recommendation model under the same amount of time. This can be either achieved by building a more accurate recommendation model with a larger parameter set (for example the number of latent factors can be increased at latent factor models), or running the same training setting for more epochs. Third, the saved computational overhead obtained by replacing a slower method can be devoted for other purposes.

Now, a short overview of the basics of matrix factorization, as well as the alternating least squares methods both for explicit and implicit data sets will be described.

Matrix Factorization

From now on, the following notations are used in this application. N and M denote the number of users and items, respectively. We use $u \in \{1, \ldots, N\}$ as index for users, and $i, j \in \{1, \ldots, M\}$ as indices for items. The rating of user u on item i is $r_{ui}$, and its prediction is $\hat{r}_{ui}$. All $r_{ui}$ ratings are arranged in R; $\mathcal{R}$ denotes the set of (u,i) indexes of R where (a) a rating is provided (for explicit feedback), (b) a positive feedback is provided (for implicit feedback). $\mathcal{R}^{\pm}$ denotes each (u,i) pair of R, i.e. $|\mathcal{R}^{\pm}|=N \cdot M$. Let $n_u$ denote the number of ratings of user u, i.e. $n_u=|\{u: (u,i) \in \mathcal{R}\}|$. Let $n_i$ denote the number of ratings of item i, i.e. $n_i=|\{i: (u,i) \in \mathcal{R}\}|$.

Matrix factorization approaches have been applied successfully for both rating-based and implicit feedback-based collaborative filtering (CF) problems. MF methods perform a so-called low rank matrix approximation: the matrix R is approximated as a product of two lower rank matrices: $R \approx PQ^T$, where $P \in R^{N \times K}$ is the user feature matrix, $Q \in R^{M \times K}$ is the item feature matrix, K is the number of latent factors that is a predefined constant, and the approximation is only performed at $(u,i) \in \mathcal{R}$ positions.

The $r_{ui}$ element of R is approximated by $$\hat{r}_{ui} = p_u^T q_i.$$

Here $p_u \in R^{K \times 1}$ is the user feature vector, the u-th row of P, and $q_i \in R^{K \times 1}$ is the item feature vector, the i-th row of Q. The approximation aims to minimize the error of prediction, $e_{ui} = r_{ui} - \hat{r}_{ui}$, while keeping the Euclidean norm of the user and item feature vectors small:

$$(P^*, Q^*) = \mathrm{argmin}_{P,Q} \sum_{(u,i) \in \mathcal{R}} \Box(e_{ui}^2 + \lambda p_u^T p_u + \lambda q_i^T q_i).$$

The predefined regularization parameter $\lambda$ trades off between small training error and small model weights.

There are two commonly used approaches to perform the approximate matrix factorization task, one is based on the well-known gradient descent algorithm and the other one is the aforementioned alternating least squares (ALS) algorithm. Here we investigate ALS, which can be effectively used also for implicit feedback datasets. ALS is based on ridge regression (RR), which will be introduced briefly herewith.

Ridge Regression

Let us assume that we are given n training examples: $x_1, \ldots, x_n \in R^{K \times 1}$, forming the matrix $X \in R^{n \times K}$, with corresponding target values $y_1, \ldots, y_n \in R$ that are arranged in the vector of target variables $y \in R^{n \times 1}$. With ridge regression one aims at finding a $w \in R^{K \times 1}$ vector such that both the error of approximating $y_i$ with $w^T x_i$ and the quantity $w^T w$ are small. Ridge regression seeks the minimum of the cost function $$\lambda w^T w + \sum_{i=1}^{n} \Box (w^T x_i - y_i)^2, \tag{1}$$

where $\lambda > 0$ is the regularization factor. The cost function (1) can be easily minimized with $$w = (\lambda I + A)^{-1} d, \tag{2}$$

where $I \in R^{K \times K}$ is the identity matrix, and $$A = X^T X, \quad d = X^T y. \tag{3}$$

The determination of (2) is dominated by the computation of A, which is $O(K^2 n)$, and the matrix inversion, which is $O(K^3)$.

When some training examples are more important than others, we can assign the training examples non-negative importance weight (confidence level); denoted here by $c_i$. At this weighted ridge regression the goal is to minimize the cost function:

$$\lambda w^T w + \sum_{i=1}^{n} \Box c_i (w^T x_i - y_i)^2. \tag{4}$$

Consequently, the computation of A and d changes to:

$$A = X^T C X = \sum_{i=1}^{n} \Box c_i x_i x_i^T, \tag{5}$$

$$d = X^T C y = \sum_{i=1}^{n} \Box c_i x_i y_i,$$

where $C \in R^{n \times n}$ is a diagonal matrix containing the $c_i$ values along its diagonal.

ALS Algorithm

ALS alternates between two steps: the P-step fixes Q and recomputes P, the Q-step fixes P and recomputes Q. The recomputation of P is performed by solving a separate RR problem for each user: for the u-th user it takes the feature vector ($q_i$) of items rated by the user as input variables, and the value of the ratings ($r_{ui}$) as output variable, and finds the optimal $p_u$ by RR. Though, in the original paper of Bell et al., a non-negative RR is performed, here we relax this restriction and allow for negative values in the solution.

Formally, let the matrix $Q[u] \in R^{n_u \times K}$ denote the restriction of Q to the items rated by user u, where $n_u = |\{i: (u,i) \in \mathcal{R}\}|$, the vector $r_u \in R^{n_u \times 1}$ denote the ratings given by the u-th user to the corresponding items, and let $$A_u = Q[u]^T Q[u] = \sum_{i:(u,i)\in \mathcal{R}} \Box q_i q_i^T, \quad (6)$$

$$d_u = Q[u]^T r_u = \sum_{i:(u,i)\in \mathcal{R}} \Box r_{ui} \cdot q_i \quad (7)$$

where $A_u$ is the covariance matrix of input (considering user u in context) and $d_u$ is the input-output covariance vector. Then RR recomputes $p_u$ as $$p_u = (\lambda n_u I + A_u)^{-1} d_u. \quad (8)$$

In the P-step, a ridge regression is solved for each user, i.e. the user feature matrix is optimized on a vector basis by using all of the other user feature vectors currently available in the user feature matrix in order to optimize P. This requires a relatively large computational time, the order of which is $$O\left(\sum_{u=1}^{N} \Box(K^2 n_u + K^3)\right)$$

time, that is $O(K^2|\mathcal{R}|+NK^3)$ as noted in the prior art literature. Similarly, the Q-step also requires a computational time of $O(K^2|\mathcal{R}|+MK^3)$. The number of recomputations of the user feature vectors and the item feature vectors, i.e. the number of P-steps and Q-steps, ranges between 10 and a "few tens" for the conventional ALS algorithm.

IALS Algorithm

In the case of the implicit feedback, it is assumed that each user rates each item either positively (user u viewed item i) or negatively (user u did not view item i). This is in contrast with the explicit case, where only a small subset of items are rated (but usually on a finer scale). Consequently, at implicit feedback the recommendation algorithm should handle a full rating matrix, in contrast to the explicit feedback case, where the rating matrix is typically a sparse matrix. Given that the sparsity of the explicit rating matrix is usually less than 1%, the difference in the size of the data is usually several orders of magnitude.

A variant of ALS as proposed by Hu et al. and referred to as IALS below has been especially developed for implicit feedback datasets. The key idea behind this approach is to assign a preference value $r_{ui}$ and a confidence level $c_{ui}$ to each element of $\mathcal{R}^\pm$. Preference typically takes values 0 and 1, indicating whether a user watched a particular item or not. The confidence level is related to how confident we are about user preferences. If a user watched the item for long, or visited it two times, we can be more confident about his preference. Then the optimal model is defined as:

$$(P^*, Q^*) = \text{argmin}_{P,Q} \sum_{(u,i)\in \mathcal{R}\pm} \Box c_{ui} \cdot e_{ui}^2 + \lambda \sum_u \Box p_u^T p_u + \lambda \sum_i \Box q_i^T q_i,$$

where $e_{ui} = r_{ui} - p_u^T q_i$ is the prediction error. Note that $\mathcal{R}^\pm$ contains all (u,i) pairs regardless of whether user u has watched item i or not. The authors use one restriction, namely, if user u has not watched item i, then $r_{ui} = r_0 = 0$ and $c_{ui} = c_0 = 1$, where $r_0$ and $c_0$ are predefined constants, typically set to $r_0 = 0$ and $c_0 = 1$. Similarly to the explicit feedback case, the authors used ALS to solve the problem, but with the following two differences:

handling confidence levels: the covariance matrix $A_u$ and covariance vector $d_u$ contains now a confidence-weighted sum (the weighted RR case);

the sums are taken over all items (or users, since all user rated all items, and vice versa). Hu et al. also proposed an efficient solution to the second issue: when recomputing P, they calculate an initial covariance matrix $A_0$ and a vector $d_0$ for a virtual user who watched no items:

$$A_0 = \sum_i \Box c_0 \cdot q_i q_i^T, \quad (9)$$

$$d_0 = \sum_i \Box c_0 \cdot r_0 \cdot q_i.$$

For now, let $\mathcal{R} = \{(u,i): r_{ui} \neq r_0 \vee c_{ui} \neq c_0\}$. For user u the calculation of the covariance matrix is started with $A_0$ and then for each positive implicit rating, the did-not-watch-assumption is replaced with a combined expression, thus obtaining:

$$A_u = A_0 + \sum_{i:(u,i)\in R\pm} \Box(-c_0 + c_{ui}) \cdot q_i^T q_i,$$

$$d_u = d_0 + \sum_{i:(u,i)\in R\pm} \Box(-c_0 \cdot r_0 + c_{ui} \cdot r_{ui}) \cdot q_i.$$

Then $p_u$ is computed by using the conventional ridge regression algorithm RR:

$$p_u = (\lambda I + A_u)^{-1} d_u. \quad (10)$$

In this paper, it is also pointed out that the time complexity of recomputing P and Q are $O(K^2|\mathcal{R}^\pm|+K^3N)$ and $O(K^2|\mathcal{R}^\pm|+K^3M)$, respectively. It is also shown experimentally that larger K values yield better prediction performance.

Speed-Up from $K^3$ TO $K^2$

In the paper of Pilászy et al. "Computational complexity reduction for factorization-based collaborative filtering algorithms" (*EC-Web-09*: 10*th Int. Conf. on Electronic Commerce and Web Technologies*, pages 229-239, 2009), it is proposed to apply the Sherman-Morrison formula (SMF) to speed up ALS, while retaining exactly the same result of the algorithm. The Sherman-Morrison formula allows to efficiently update the inverse of the covariance matrix when the covariance matrix is updated by an example. To recompute P, the time complexity is reduced from $O(K^2|\mathcal{R}|+NK^3)$ to $O(K^2|\mathcal{R}|)$, for both explicit and implicit feedback datasets.

However, this theoretical speed-up does not turn into real speed-up in many cases. For example, consider the case when $\mathcal{R} = 10^8$, N=500 000, M=20 000, and assume for the SMF-variant merely a constant factor of 2 hidden in the O-notation. The number of floating point operations for various K values are shown in Table 1.

TABLE 1

| K | ALS without SMF:<br>$2K^2|\mathcal{R}| + (N + M)K^3$ | ALS with<br>SMF: $4K^2|\mathcal{R}|$ |
|---|---|---|
| 50 | $5.7 \cdot 10^{11}$ | $10 \cdot 10^{11}$ |
| 100 | $2.5 \cdot 10^{12}$ | $4 \cdot 10^{12}$ |

TABLE 1-continued

| K | ALS without SMF: $2K^2|\mathcal{R}| + (N+M)K^3$ | ALS with SMF: $4K^2|\mathcal{R}|$ |
|---|---|---|
| 200 | $1.2 \cdot 10^{13}$ | $1.6 \cdot 10^{13}$ |
| 500 | $11.5 \cdot 10^{12}$ | $10 \cdot 10^{13}$ |
| 1000 | $7.2 \cdot 10^{14}$ | $4 \cdot 10^{14}$ |

This means that even with the very large K, e.g. K=1000, only a speed-up factor of approx. 2 can be achieved by using the SMF formula. Consequently, the proposed SMF-variant is advantageous only when the average number of ratings per user and per item are both small. In the above example, the average number of ratings per user is 200 and the average number of ratings per item is 5000.

RR1: An Enhanced Ridge Regression Algorithm

Based on the above introduced ridge regression method, an approximate algorithm for optimizing expression (4) will now be described according to the invention. This algorithm will be referred to as algorithm RR1 below.

Let $e_i = y_i - w^T x_i$ denote the error on the i-th example. The proposed algorithm works as follows:

Let us denote the k-th element of w by $w_k$ (k=1, ..., K). Let us initialize w with 0. Let us find the optimal solution only for $w_1$, assuming that the other elements of the vector w are fixed. In the next step, let us optimize $w_2$, assuming that other scalar element of the particular vector w (i.e. $w_1, w_3, w_4, ..., w_K$) are fixed, and so on. Thus in each step we optimize only one scalar element of w. The loop of the consecutive separate optimization of $w_k$-s is repeated until a termination condition is met.

The repeated computation of $w_k$ is a univariate ridge regression, whereas the computation of the entire w is a multivariate ridge regression. To optimize only $w_k$, the following ridge regression problem is to be solved:

$$\forall_{i=1}^{n} \; w_k x_{ik} \approx y_i - \sum_{l \neq k} \Box w_l x_{il}. \quad (11)$$

Here $x_{il}$ is the (i,l)-th element of X. We refer to k as the active feature.

At implementation, initially we can set $w_k$ to 0. With this modification $$y_i - \sum_{l \neq k} \Box w_l x_{il}$$

in eq. (11) becomes equal to $e_{ui} = y_i - w^T x_i$. However, when $w_k$ is changed to $w_k'$, (i.e. the new value of $w_k$) $e_i$ can be easily updated to $e'_i$:

$$\forall_{i=1}^{n} e'_i = e_i - (w'_k - w_k) x_i, \quad (12)$$

In other words, after the optimization of $w_{k-1}$, but before the optimization of $w_k$, the expression $$y_i - \sum_{l \neq k} \Box w_l x_{il}$$

can be efficiently computed for each i in a total of O(n) time.

The basic idea of the enhanced ridge regression method according to the invention is that only one scalar element of the vector w is optimized at one step, which results in a sequence of separate univariate optimization steps for the scalar elements of w. Due to the down-grading of the optimization task from a multivariate vector-based level to univariate scalar level in the above enhanced ridge regression method, a further speed-up of the ALS and IALS algorithms from $K^3$ to $K^{\Box}$ may be achieved.

The weighted ridge regression method (referred to as algorithm RR1 below) may be described formally as follows:

Algorithm RR1(n; K; λ; $x_\perp 1, \ldots, x_\perp n$; $y_\perp 1, \ldots, y_\perp n$; L; $w^\uparrow 0$)

Input: n: number of examples,
K: number of features, λ: regularization factor,
$x_1, \ldots, x_n \in R^{K \times 1}$: training examples,
$y_1, \ldots, y_n$: target variables,
L: number of cycles, $w^0$: initial weight vector, or 0.
Output: w: the optimized weight vector
1.     Let $w \leftarrow w^0$ and let $\forall_{i=1}^n$: $e_i \leftarrow y_i - w^T x_i$
2.     for L times do
3.        one cycle:
4.        for k ← 1 to K do
5.           $\forall_{i=1}^n$: $e_i \leftarrow e_i + w_k x_{ik}$
6.           $w_k \leftarrow 0$
7.           $a \leftarrow \sum_{i=1}^n \Box x_{ik} x_{ik}$
8.           $d \leftarrow \sum_{i=1}^n \Box x_{ik} e_i$
9.           $w_k \leftarrow \dfrac{d}{\lambda + a}$.
10.         $\forall_{i=1}^n$: $e_i \leftarrow e_i - w_k x_{ik}$
11.        end
12.     end In an alternative variant of the enhance ridge regression algorithm, similarly to the above described weighted ridge regression algorithm, a non-negative importance weight (confidence level), denoted here by $c_i$, may also be assigned to the training examples when some training examples are regarded more important than other ones. This enhanced weighted ridge regression method (referred to as RR1C below) may be described formally as follows:

Algorithm RR1C(n; K; λ; $x_\perp 1, \ldots, x_\perp n$; $y_\perp 1, \ldots, y_\perp n$; $c_\perp 1, \ldots, c_\perp n$; L; $w^\uparrow 0$)

Input: n: number of examples,
K: number of features, λ: regularization factor,
$x_1, \ldots, x_n \in R^{K \times 1}$: training examples,
$y_1, \ldots, y_n$: target variables, $c_1, \ldots, c_n$: weight of examples,
L: number of cycles, $w^0$: initial weight vector, or 0.
Output: w: the optimized weight vector
1.     Let $w \leftarrow w^0$ and let $\forall_{i=1}^n$: $e_i \leftarrow y_i - w^T x_i$
2.     for L times do
3.        one cycle:
4.        for k ← 1 to K do
5.           $\forall_{i=1}^n$: $e_i \leftarrow e_i + w_k x_{ik}$
6.           $w_k \leftarrow 0$
7.           $a \leftarrow \sum_{i=1}^n \Box c_i x_{ik} x_{ik}$ Algorithm RR1C(n; K; λ; $x_\perp 1, \ldots, x_\perp n; y_\perp 1, \ldots, y_\perp n; c_\perp 1, \ldots, c_\perp n$; L; $w^\uparrow 0$)

8. $$d \leftarrow \sum_{i=1}^{n} \Box c_i x_{ik} e_i$$

9. $$w_k \leftarrow \frac{d}{\lambda + a}.$$

10. $\forall_{i=1}^{n}: e_i \leftarrow e_i - w_k x_{ik}$
11. end
12. end

It should be noted that by setting each importance weight (or confidence value) $c_i$ to 1, the basic enhanced ridge regression method (RR1) is obtained.

A few notes to the above algorithms RR1 and RR1C:

Line 1 initializes the inner variables. The outermost for-cycle repeatedly optimizes each scalar element of w.

Lines 5-6 set $w_k$ to 0 and adjusts the $e_i$ variables accordingly. Lines 7-8 compute the 1×1 variant of A and d respectively.

Line 9 actually executes a matrix inversion that is merely a division in a 1×1 case.

Line 10 adjusts the $e_i$ variables, since $w_k$ was changed.

Note that RR1 and RR1C use only the diagonal of $A \in R^{K \times K}$ that can be precomputed and does not change between two consecutive cycles. The computational complexity of one cycle is O(nK). Assuming that the number of cycles is L, and the diagonal of A, is precomputed, the total running time of optimizing one vector w is O(LnK). If L is small, a significant speed-up can be achieved as compared to $O(K^2 n)$.

Now a particular example will be presented to illustrate how the enhanced ridge regression method according to the present invention can be used to optimize the vector w using subsequent univariate optimization steps for the scalar elements of w.

Let us assume that a vector y should be approximated as better as possible (with the minimum least square error, for example) by the product of a matrix X and a vector w by carrying out the optimization of w, i.e. y≈Xw. Let us set w=0 at the start:

$$\begin{bmatrix} 0.8 \\ 1.9 \\ 1.6 \\ 2.3 \\ 2.1 \\ 1.2 \\ 1.9 \\ 1.9 \end{bmatrix} \approx \begin{bmatrix} 1.3 & 1.2 & 0.1 & 0.6 & 0.1 \\ 1.7 & 2.9 & 0.4 & 0.3 & 1.8 \\ 1.7 & 2.7 & 2.0 & 0.2 & 1.1 \\ 1.3 & 1.7 & 2.5 & 2.0 & 2.9 \\ 0.1 & 2.9 & 1.3 & 1.3 & 1.3 \\ 0.0 & 0.2 & 2.2 & 2.1 & 1.8 \\ 0.7 & 2.2 & 2.5 & 2.9 & 0.5 \\ 1.6 & 2.0 & 2.5 & 1.4 & 2.7 \end{bmatrix} \cdot \begin{bmatrix} 0.0 \\ 0.0 \\ 0.0 \\ 0.0 \\ 0.0 \end{bmatrix}$$

The first optimization step results in $w_1$=1.2, and the value of target function (sum of squared errors, see equation (1) with λ=0) is 7.5:

$$\begin{bmatrix} 0.8 \\ 1.9 \\ 1.6 \\ 2.3 \\ 2.1 \\ 1.2 \\ 1.9 \\ 1.9 \end{bmatrix} \approx \begin{bmatrix} 1.3 & 1.2 & 0.1 & 0.6 & 0.1 \\ 1.7 & 2.9 & 0.4 & 0.3 & 1.8 \\ 1.7 & 2.7 & 2.0 & 0.2 & 1.1 \\ 1.3 & 1.7 & 2.5 & 2.0 & 2.9 \\ 0.1 & 2.9 & 1.3 & 1.3 & 1.3 \\ 0.0 & 0.2 & 2.2 & 2.1 & 1.8 \\ 0.7 & 2.2 & 2.5 & 2.9 & 0.5 \\ 1.6 & 2.0 & 2.5 & 1.4 & 2.7 \end{bmatrix} \cdot \begin{bmatrix} 1.2 \\ 0.0 \\ 0.0 \\ 0.0 \\ 0.0 \end{bmatrix}$$

The next optimization step optimizes only $w_2$, and results in $w_2$=0.2, the value of the target function is reduced to 6.2.

$$\begin{bmatrix} 0.8 \\ 1.9 \\ 1.6 \\ 2.3 \\ 2.1 \\ 1.2 \\ 1.9 \\ 1.9 \end{bmatrix} \approx \begin{bmatrix} 1.3 & 1.2 & 0.1 & 0.6 & 0.1 \\ 1.7 & 2.9 & 0.4 & 0.3 & 1.8 \\ 1.7 & 2.7 & 2.0 & 0.2 & 1.1 \\ 1.3 & 1.7 & 2.5 & 2.0 & 2.9 \\ 0.1 & 2.9 & 1.3 & 1.3 & 1.3 \\ 0.0 & 0.2 & 2.2 & 2.1 & 1.8 \\ 0.7 & 2.2 & 2.5 & 2.9 & 0.5 \\ 1.6 & 2.0 & 2.5 & 1.4 & 2.7 \end{bmatrix} \cdot \begin{bmatrix} 1.2 \\ 0.2 \\ 0.0 \\ 0.0 \\ 0.0 \end{bmatrix}$$

In the third optimization step, $w_3$ is optimized, resulting in $w_3$=0.1 and the target function value is 5.7.

$$\begin{bmatrix} 0.8 \\ 1.9 \\ 1.6 \\ 2.3 \\ 2.1 \\ 1.2 \\ 1.9 \\ 1.9 \end{bmatrix} \approx \begin{bmatrix} 1.3 & 1.2 & 0.1 & 0.6 & 0.1 \\ 1.7 & 2.9 & 0.4 & 0.3 & 1.8 \\ 1.7 & 2.7 & 2.0 & 0.2 & 1.1 \\ 1.3 & 1.7 & 2.5 & 2.0 & 2.9 \\ 0.1 & 2.9 & 1.3 & 1.3 & 1.3 \\ 0.0 & 0.2 & 2.2 & 2.1 & 1.8 \\ 0.7 & 2.2 & 2.5 & 2.9 & 0.5 \\ 1.6 & 2.0 & 2.5 & 1.4 & 2.7 \end{bmatrix} \cdot \begin{bmatrix} 1.2 \\ 0.2 \\ 0.1 \\ 0.0 \\ 0.0 \end{bmatrix}$$

The fourth optimization step results in an optimized value for $w_4$, being equal to 0.1, and the target function value is reduced to 5.4.

$$\begin{bmatrix} 0.8 \\ 1.9 \\ 1.6 \\ 2.3 \\ 2.1 \\ 1.2 \\ 1.9 \\ 1.9 \end{bmatrix} \approx \begin{bmatrix} 1.3 & 1.2 & 0.1 & 0.6 & 0.1 \\ 1.7 & 2.9 & 0.4 & 0.3 & 1.8 \\ 1.7 & 2.7 & 2.0 & 0.2 & 1.1 \\ 1.3 & 1.7 & 2.5 & 2.0 & 2.9 \\ 0.1 & 2.9 & 1.3 & 1.3 & 1.3 \\ 0.0 & 0.2 & 2.2 & 2.1 & 1.8 \\ 0.7 & 2.2 & 2.5 & 2.9 & 0.5 \\ 1.6 & 2.0 & 2.5 & 1.4 & 2.7 \end{bmatrix} \cdot \begin{bmatrix} 1.2 \\ 0.2 \\ 0.1 \\ 0.1 \\ 0.0 \end{bmatrix}$$

The next optimization step optimizes $w_5$, which results in $w_5$=|0.1 and the target function value is 5.0.

$$\begin{bmatrix} 0.8 \\ 1.9 \\ 1.6 \\ 2.3 \\ 2.1 \\ 1.2 \\ 1.9 \\ 1.9 \end{bmatrix} \approx \begin{bmatrix} 1.3 & 1.2 & 0.1 & 0.6 & 0.1 \\ 1.7 & 2.9 & 0.4 & 0.3 & 1.8 \\ 1.7 & 2.7 & 2.0 & 0.2 & 1.1 \\ 1.3 & 1.7 & 2.5 & 2.0 & 2.9 \\ 0.1 & 2.9 & 1.3 & 1.3 & 1.3 \\ 0.0 & 0.2 & 2.2 & 2.1 & 1.8 \\ 0.7 & 2.2 & 2.5 & 2.9 & 0.5 \\ 1.6 & 2.0 & 2.5 & 1.4 & 2.7 \end{bmatrix} \cdot \begin{bmatrix} 1.2 \\ 0.2 \\ 0.1 \\ 0.1 \\ -0.1 \end{bmatrix}$$

In the subsequent optimization epochs (loops), the scalar elements $w_1, \ldots, w_5$ are repeatedly optimized several times by using all currently available scalar elements of the vector w (except the one to be computed). After a termination condition has been met, the final set of the scalar elements of w are regarded as a near-optimal solution for w. In the present example, the vector w would include the following optimal scalar elements with an aggregated square error of 0.055:

$$w^T = [0.0 \; 0.4 \; -0.01 \; 0.3 \; 0.3]$$

ALS1: A Modified ALS Algorithm for Explicit User Preference Feedback

Recall that ALS alternates between P-steps and Q-steps. The emphasis is on recomputation: when it recomputes P, it completely ignores the result of its previous computation. When RR is replaced with RR1 (or RR1C), the enhanced (weighted) fast ridge regression algorithm according to the invention, in a P-step, each scalar element of the user feature vector $p_u$ is individually computed from all other scalar elements of $p_u$ and all scalar elements of the fixed item feature matrix Q. Thus, in a P-step the scalar elements of the user feature vector are rather "further optimized" than "recomputed". A Q-step is carried out analogously, i.e. by fixing the user feature matrix P and in the subsequent item feature vectors, further optimizing a previous item feature vector $q_i$ by individually computing each scalar element thereof from all other scalar elements of $q_i$ and all scalar elements of the fixed user feature matrix P.

The basic steps of the ALS1 algorithm are as follow:
initializing said user feature matrix P and said item feature matrix Q with predefined initial values,
alternately optimizing said user feature matrix P and said item feature matrix Q until a termination condition is met, wherein
(i) in a P-step, a cost function $$F(p_u) = \lambda p_u^T p_u + \sum_{i=1}^{M} \Box c_{ui}(p_u^T q_i - r_{ui})^2$$

is minimized for each user feature vector $p_u$ of said user feature matrix P with a fixed item feature matrix Q, and
(ii) in a Q-step, a cost function $$F(q_i) = \lambda q_i^T q_i + \sum_{i=1}^{N} \Box c_{ui}(p_u^T q_i - r_{ui})^2$$

is minimized for each item feature vector $q_i$ of said item feature matrix Q with a fixed user feature matrix P,
wherein $\lambda$ is a preset regularization factor, $c_{ui}$ is a confidence value with respect to user u and item i, and $r_{ui}$ is the rating value for an item i evaluated by a user u, and
wherein in each of the P-steps, each scalar element of $p_u$ is computed from all other scalar elements of and the fixed matrix Q, and similarly, in each of the Q-steps, each scalar element of $q_i$, is computed from all other scalar elements of $q_i$ and the fixed matrix P.

The running time of one epoch (loop) of ALS1 is very favorable, as it is $O(K|\mathcal{R}|)$, which means a linear function of the number of latent factors K. Recall that in the conventional ALS algorithm, one epoch requires $O(K^2|\mathcal{R}|+(N+M)K^3)$ time. The speed-up can be attributed to the approximate solution applied for the matrix inversion. The ALS1 algorithm according to the invention does not reproduce the results of ALS; with the same parameter setting, usually it achieves a slightly inferior prediction accuracy (as will be described below). On the other hand, due to the speed-up of the ALS1 algorithm trained with a somewhat larger number of latent factors K, it can easily reach the accuracy of the original ALS algorithm under significantly smaller amount of time.

The ALS1 algorithm may be formally described as follows.

---

Algorithm ALS1

---

Input: R and $\mathcal{R}$: the matrix of ratings (in a sparse representation),
K : number of features, $\lambda$ : regularization factor,
Output: P and Q : the user and item feature matrices
1. Initialize P and Q randomly
2. while a terminal condition is not met do
3.    //P -step
4.    for u ← 1 to N do
5.      $p'_u$ ← RR1( n is $n_u$: K is K: $\lambda$ is $\lambda$: $x_1,\ldots,x_n$ is [$q_i$: (u,i) ∈ $\mathcal{R}$ ]; };
6.      $y_1, \ldots, y_n$ is $\{r_{ui}$: (u,i) ∈ $\mathcal{R}\}$; $c_1, \ldots, c_n$ is 1; L is 1;
7.      $w^0$ is $p_\perp u$) ;
8.      $p_u$ ← $p'_u$
9.    end
10.   //Q -step:
11.    for i ← 1 to M do
12.      $q'_i$ ← RR1( n is $n_i$: K is K: $\lambda$ is $\lambda$: $x_1,\ldots,x_n$ is [$p_i$: (u,i) ∈ $\mathcal{R}$ ]; };
13.      $y_1, \ldots, y_n$ is $\{r_{ui}$: (u,i) ∈ $\mathcal{R}\}$; $c_1, \ldots, c_n$ is 1; L is 1;
14.      $w^0$ is $q_\perp i$) ;
15.      $q_i$ ← $q'_i$
16.    end
17. end

---

The above described modified ALS algorithm may equally incorporate the weighted enhanced ridge regression algorithm RR1C instead of the basic RR1 algorithm, i.e. in the above formal description of the ALS1 algorithm, the importance weights c, may be set to any non-negative value (instead of setting each of them to 1).

Due to the optimization of only one scalar element of a user feature vector $p_u$ in a P-step (or only one scalar element of an item feature vector $q_i$ in a Q-step), the subsequent scalar available. In contrast with ALS, in any P-step ALS1 uses not only matrix Q, but also the values of previously computed elements of vectors $p_u$ in the computation of the new values of vector $p_u$. Similarly, in any Q-step, ALS1 uses not only matrix P, but also the values of previously computed elements of vectors $q_i$ in the computation of the new values of vector $q_i$. Using the previously computed values of the vectors $p_u$ and $q_i$ as initialization values ensure a faster convergence of the vectors $p_u$ and $q_i$ to their optimum, while keeping the computational complexity at a significantly lower level as ever before.

IALS1: A Modified IALS Algorithm for Implicit User Preference Feedback

For the sake of simplicity, the modified IALS method according to the invention will be described only through the optimization in a P-step; the Q-step can be treated analogously. As mentioned above, at implicit user preference feedback, a full rating matrix should be provided. To overcome the largely increased quantity of rating data, in the IALS algorithm a virtual user was introduced who rated all items negatively (i.e. he watched nothing). Here we show how the conventional ridge regression algorithm RR can be replaced with our proposed RR1 algorithm to obtain a fast IALS algorithm for implicit user preference feedback, and how the favorable efficiency of the proposed RR1 algorithm can be adapted to involve a virtual user to this case.

Generating Synthetic Examples

Let us again introduce a virtual user, with the corresponding covariance matrix $A_0$ and vector $d_0$ as in eq. (9). RR uses only the $A_0$ matrix and the $d_0$ vector. On the other hand, RR1 uses the diagonal of $A_0$, the $d_0$ vector, and it also needs all the original examples (that generate $A_0$ and $d_0$), which makes inappropriate to combine the advantageous properties of RR1 and IALS.

However, instead of using all the M items in the calculation of $A_0 \in R^{K \times K}$ and $d_0 \in R^{K \times 1}$ (cf. eq. (9)), we can generate them using a much smaller synthetic item subset, containing only exactly K synthetic items.

Next we show how we can generate those K synthetic items (linear combination of items) such that properly rating these items will exactly reproduce $A_0$ and $d_0$, i.e. the items) such that properly rating these items will exactly reproduce $A_0$ and $d_0$, i.e. the covariance matrix and the input-output covariance of the user with all negative ratings. In this way, from the viewpoint of RR or RR1, rating these K items will be equivalent to rating all the M items negatively.

Since $A_0$ is a symmetric real matrix (and also positive semi-definite), its eigenvalue decomposition $$A_0 = S \Lambda S^T \quad (13)$$

exists, where $S \in R^{K \times K}$ is the orthogonal matrix of the eigenvectors ($S^T S = SS^T = I$), and $\Lambda \in R^{K \times K}$ is a diagonal matrix, containing the non-negative eigenvalues.

Let $G = \sqrt{\Lambda} S^T$, then $G^T = S\sqrt{\Lambda}$. Let $g_j \in R^{K \times 1}$ denote the i-th column of $G^T$ (here j=1, ..., K), that is the feature vector of the j-th aforementioned synthetic example. Note that if a user rates the $g_j$ examples with confidence level $c_j = 1$, the resulting covariance matrix, $$A_0^{I_{z_0}} = \sum_{i=1}^{K} \square c_j g_j g_j^T = G^T G$$

will be equal to $A_0$.

Next we specify the ratings $r_j$ on these $g_j$ examples, such that $d_0$ is exactly reproduced. Let $r \in R^{K \times 1}$ denote the vector of $r_j$ if values. Then, by definition, we have $$d'_{0_z} = \sum_{j=1}^{K} \square c_j r_j g_j = G^T r.$$

To make the left hand side equal to $d_0$, we have to solve this system of linear equations for r as $(G^T)^{-1} d_0$. In some rare cases, G may be non-invertible. It can be shown that even in this case, $d_0$ is in the image of matrix G (the proof is omitted here due to the lack of space). Summarizing the above construction in a nutshell: rating all items with $c_0$ confidence and $r_0$ as rating value is equivalent to rating the synthetic items $g_j$ (j=1, ..., ..., K) with $c_j = 1$ confidence and $r_j$ as rating value.

Using Synthetic Examples

Now we describe how IALS1 uses the synthetic examples. To recompute $p_u$, we assume that the user u rated the following items:
for j=1, ..., K, he rated $g_i$ as $r_j$, with $c_j = 1$
for i: (u,i)$\in \mathcal{R}$, he rated $q_i$ as $r_0$, with $-c_0$ confidence level (negative implicit feedback cancelation examples);
for is i: (u,i)$\in \mathcal{R}$, he rated $q_i$ as $r_{ui}$, with $c_{ui}$ confidence level (aggregation of positive implicit feedbacks).

We apply RR1 for one cycle with these examples, where $p_u$ is regarded as the vector to be optimized by RR1 (i.e. $p_u$ corresponds to vector w of RR1).

Handling Regularization

Regularization (usually) means that the diagonal of A is increased by a regularization factor $\lambda$, which can be also user-dependent: $\lambda_u$. In the context of IALS1, regularization can be handled easily: assume that the regularization factor for user u is $\lambda_u$, i.e. we try to minimize the following cost function:

$$\sum_{(u,i) \in R\pm} \square c_{ui}(r_{ui} - p_u^T q_i)^2 + \sum_{u=1}^{N} \square \lambda_u p_u^T p_u + \sum_{i=1}^{M} \square \lambda_i q_i^T q_i.$$

When optimizing $p_u$, we can create K synthetic regularization examples with a rating value 0 and a confidence level 1. Let the k-th such synthetic example be the k-th row of $\sqrt{\lambda_u} I$. If the user rates all these K examples with a confidence level 1 and a rating value 0, the diagonal of $A_u$ is increased exactly by $\lambda_u I$.

Now we summarize the steps of computing $p_u$, by assuming user-dependent regularization:
for j=1, ..., K she rated $g_j$ as $r_j$, with $c_j = 1$ confidence level (synthetic negative implicit feedback examples);
for i: (u,i)$\in \mathcal{R}$, she rated $q_i$ as $r_0$, with I $c_0$ confidence level (negative implicit feedback cancelation examples); for i: (u,i)$\in \mathcal{R}$, she rated $q_i$ as $r_{ui}$, with $c_{ui}$ confidence level (aggregation of positive implicit feedbacks);
for j=1, ..., K, she rated the j-th row of $\sqrt{\lambda_u} I$ as 0, with 1 confidence level (regularization examples).

We apply RR1 for one cycle with these examples on $p_u$ where $p_u$ is regarded as the vector to be optimized by RR1 (i.e. $p_u$ corresponds to vector w of RR1).

A few remarks on regularization:

We can achieve the same results by not creating these synthetic regularization examples, but calling RR1 with $\lambda_u$ as a regularization factor. In other words: we can exploit the sparseness of the regularization examples.

If the value $\lambda_u$ of does not depend on u, we can merge these synthetic regularization examples into the $A_0$ and $d_0$ variables, and skip the regularization step when optimizing $p_u$.

We can reduce the number of examples in RR1 cycles by merging the negative implicit feedback cancelation example and the aggregation of positive implicit feedbacks to a single positive difference example. This can be both used in the regularized and in the non-regularized version. Practically the $2^{nd}$ and $3^{rd}$ subsets of examples are unified as for i:(u,i)$\in$R, he rated $$q_i \text{ as } \frac{-c_o r_o + c_{ui} r_{ui}}{-c_o + c_{ui}},$$

with I $c_0 + c_{ui}$ confidence (positive difference examples)

Computational Complexity

In the beginning of the P-step, we need to compute G and r, which requires $O(MK^2 + K^2)$ time. For each user, optimizing $p_u$ requires $O(K(K+n_u+n_u))=O(K^2+Kn_u)$ time. If we sum it for each user, we get $O(NK^2+K|\mathcal{R}|)$. Thus, the P-step requires $O(MK^2+K^3+NK^2+K|\mathcal{R}|)$ time. If we assume that M>K, which means that we have fewer latent features than items, then this formula reduces to:

$$O(MK^2 + NK^2 + K|\mathcal{R}|)$$

which is very favorable compared to the $O(K^2|\mathcal{R}|)$ of IALS, since $M+N \ll |\mathcal{R}|$.

The following routine formally describes the above algorithm of decomposing $A_0$ and $d_0$ into $g_j$ and $r_j$ (j=1, ..., K).

---
Algorithm DECOMPOSE(K; $A_\perp 0$; $d_\perp 0$)
---

Input: K: number of features,
$A_0 \in R^{K \times K}$: a symmetric positive semidefinite matrix,
$d_0 \in R^{K \times 1}$: a column vector matrix,
Output: $g_1, \ldots, g_K \in R^{K \times 1}$, $r_1, \ldots, r_K$: the decomposition of $A_0$ and $d_0$ such that $A_0 = \sum_{j=1}^{K} \square g_j g_j^T$ and $d_0 = \sum_{j=1}^{K} \square r_j g_j$ 1. Compute the eigenvalue-decomposition of $A_0$ as $A_0 = S\Lambda S^T$
2. Let $G \leftarrow \sqrt{\Lambda} S^T$
3. $g_j \leftarrow$ the j-th column of $G^T$ (for j = 1, ..., K)
4. // Let $r \leftarrow (G^T)^{-1} d_0$, which can be simplified as $r \leftarrow \Lambda^{-0.5} S^T d_0$
5. Let $r \leftarrow \Lambda^{-0.5} S^T d_0$.
6. $r_j \leftarrow$ the j-th row r (for j = 1, ..., K)

An alternative approach to solve the above decomposition problem is formally described herewith.

---
Algorithm DECOMPOSE(K; $A_\perp 0$; $d_\perp 0$)
---

Input: K: number of features,
$A_0 \in R^{K \times K}$: a symmetric positive semidefinite matrix,
$d_0 \in R^{K \times 1}$: a column vector matrix,
Output: $g_1, \ldots, g_K \in R^{K \times 1}$, $r_1, \ldots, r_K$: the decomposition of $A_0$ and $d_0$ such that $A_0 = \sum_{j=1}^{K} \square g_j g_j^T$ and $d_0 = \sum_{j=1}^{K} \square r_j g_j$ 1. Let $B \in R^{(K+1) \times (K+1)}$ be defined as follows:
2. the upper-left K × K block of be equal to $A_0$
3. the first K elements of the (K + 1)-th row be equal to $d_0^T$
4. the first K elements of the (K + 1)-th column be equal to $d_0^\square$
5. the K + 1-th element of the (K + 1)-th column is a large enough number $\left(\text{it should be greater than } \sum_{j=1}^{M} \square c_0 r_0^2 \right)$ to ensure that B is positive semidefinite
6. Compute the Cholesky-decomposition of B as $B = LL^T$
7. $g_j \leftarrow$ the first K elements of the j-th column of $L^T$ (for each j = 1, ..., K)
8. $r_j \leftarrow$ the (j, K + 1)-th element of L (for each j = 1, ..., K)

It should be noted that the Cholesky-decomposition in the above algorithm yields a lower triangular matrix L, thus half of the elements of $g_j$-s will be zero, which can further be exploited in RR1, providing an additional speed-up, that is, the $O(NK^2)$ part of the above O( ) formula will be two times faster.

Finally, the enhanced IALS1 algorithm according to the invention can be formally described as follows.

---
Algorithm IALS1
---

Input: R and $\mathcal{R}$: the matrix of ratings (in a sparse representation),
K: number of features, λ: regularization factor,
$c_0$: confidence weight for negative implicit feedback,
$r_0$: preference value for negative implicit feedback.
Output: P and Q: the user and item feature matrices
1.   Initialize P and Q randomly
2.   while a terminal condition is met do
3.       // P-step:

---
Algorithm IALS1
---

4. $A_0 \leftarrow \sum_{i=1}^{M} c_0 \cdot q_i q_i^T$; $d_0 \leftarrow \sum_{i=1}^{M} c_0 \cdot r_0 \cdot q_i$ 5. $g_1, \ldots, g_K, r_1, \ldots, r_K \leftarrow$ DECOMPOSE(K, $A_0$, $d_0$)
6. for u ← 1 to N do
7. $p_u' \leftarrow$ RR1(n is K + $n_u$; K is K; λ is λ;
8. $\{x_1, \ldots, x_n\}$ is $\{g_1, \ldots, g_K\} \cup \{q_i: (u, i) \in \mathcal{R}\}$;

9. $\{y_1, \ldots, y_n\}$ is $\{r_1, \ldots, r_K\} \cup \left\{\frac{c_{ui} r_{ui} - c_0 r_0}{c_{ui} - c_0}: (u, i) \in \mathcal{R}\right\}$;

10. $c_1, \ldots, c_n$ is $\{1, \ldots, 1\} \cup \{(c_{ui} - c_0): (u, i) \in \mathcal{R}\}$;
11. L is 1;
12. $w^0$ is $p_\perp u$);
13. $p_u \leftarrow p_u'$
14. end
15. // Q-step:

16. $A_0 \leftarrow \sum_{i=1}^{N} c_0 \cdot p_u p_u^T$; $d_0 \leftarrow \sum_{i=1}^{N} c_0 \cdot r_0 \cdot p_u$ 17. $g_1, \ldots, g_K, r_1, \ldots, r_K \leftarrow$ DECOMPOSE(K, $A_0$, $d_0$)
18. for i ← 1 to M do
19. $q_i' \leftarrow$ RR1(n is K + $n_i$; K is K; λ is λ;
20. $\{x_1, \ldots, x_n\}$ is $\{g_1, \ldots, g_K\} \cup \{p_u: (u, i) \in \mathcal{R}\}$;

21. $\{y_1, \ldots, y_n\}$ is $\{r_1, \ldots, r_{Kl}\} \cup \left\{\frac{c_{ui} r_{ui} - c_0 r_0}{c_{ui} - c_0}: (u, i) \in \mathcal{R}\right\}$;

22. $c_1, \ldots, c_n$ is $\{1, \ldots, 1\} \cup \{(c_{ui} - c_0): (u, i) \in \mathcal{R}\}$;
23. L is 1;
24. $w^0$ is $q_\perp i$);
25. $q_i \leftarrow q_i'$
26. end
27. end The item recommender system and method according to the invention are based on the above described enhanced factorizing algorithm ALS1 or IALS1. In the following sections, preferred embodiments of the invention will be described in more detail.

Preferred Embodiments of the Item Recommender System

In a first aspect, the invention relates to an item recommender system. Such a system is typically based on a server-client architecture, wherein the server functions to control or manage a network of client devices interfacing the users of the item recommender system.

FIG. 1 schematically illustrates an item reccomender system 10 comprising a server 11 and a plurality of client devices 12 connected to the server 11 through a communication network 13.

The client devices 12 are adapted for collecting user ratings and to forward the collected user ratings, preferably in the form of rating vectors, to the server periodically.

The server 11 is configured to receive the user ratings, preferably in the form of rating vectors $r_u$, from the client devices 12 and to aggregate the user ratings into a rating matrix R. The server 11 is typically adapted for factorizing said rating matrix R into a user feature matrix P and an item feature matrix Q using the above specified ALS1 or IALS1 factorization algorithms in accordance with the invention. In this typical case, the server 11 may transmit the item feature matrix Q and selected user feature vectors $p_u$ to selected client devices 12, which can generate a predictive rating vector $\hat{r}_u$ for each selected user u associated with the particular client device 12, said predictive rating vector $\hat{r}_u$ being the product of the user feature vector $p_u$ and the item feature matrix Q. Each one of the client devices 12 is further adapted for selecting, according to a predefined selection scheme, a plurality of items from the entire set of items included in the predictive rating vector $\hat{r}_u$ for the recommendation thereof to said particular user u associated with the predictive rating vector $\hat{r}_u$.

Alternatively, the server 11 may be used only for collecting user ratings and to produce said rating matrix R, whereas the factorization itself may be performed in the client devices 12 which, for this purpose, receive the rating matrix R from the server 11 to generate a predictive rating vector $\hat{r}_u$.

A client device 12 may be, for example, a personal computer, a mobile phone, a set top box, or the like. Accordingly, the communication network 13 may include, for example, the internet, a mobile telecommunication network, a video-on-demand network, a cable TV network, etc.

In a preferred embodiment of the item recommender system 10 according to the invention, the client devices 12 are used by a plurality of users who evaluate any number of items among those that are presented them for evaluation. The user ratings, preferably in the form of rating vectors $r_u$ may be sent by the client devices 12 directly to the server 11, which, in turn, after factorization, may transmit the updated item feature matrix Q and the corresponding updated user feature vector $p_u$ to at least one of, but preferably all of the client devices 12. Based on the item feature matrix Q and the user feature vector $p_u$ recently received from the server 11, the particular client device 12 may generate a predictive rating vector $\hat{r}_u$ and make a recommendation to the associated user(s) according to the predictive rating vector $\hat{r}_u$. This configuration is particularly suitable for an online web store, wherein the server 11 may reside at the merchant's site, and the client devices 12 may reside at the users who browse in the web store through the internet, for example.

One of the most typical application of the above item recommendation system is its use in a movie reccommender service in an IPTV network. The items correspond to movies offered by the broadcaster and the users correspond to the viewers. The user ratings, i.e. direct or indirect evaluations of the movies, are collected by the transceiver units coupled to the IPTV sets and forwarded thereby to the broadcasting centre, where the user ratings are periodically aggragated into a user rating matrix, the factorization of which is then performed to produce an updated item feature matrix and an updated user feature matrix. The item feature matrix, which contains estimated latent ratings for each movie, and the user feature vectors, each of which contains estimated latent ratings of a particular user, are transmitted to the respective IPTV sets, in which a special program routine computes the estimated rating vector for the particular viewer. The estimated rating vector contains an estimated rating for all of the movies on the basis of the prior (direct or indirect) ratings of the specific viewer. The movies of likely the highest interest to the viewer will then be locally selected using a predefined selection scheme, and offered for viewing through a movie recommendation interface of the IPTV set.

Figure 2:
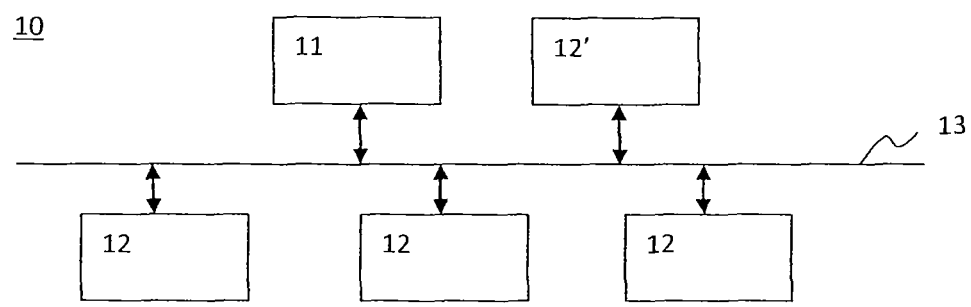
FIG. 2 is a schematic block diagram of the item recommender system according to a second embodiment of the invention.

In an alternative embodiment of the item recommender system of the invention, as shown in FIG. 2, at least one of the client devices 12' may be associated with a service provider (also referred to as an SP client device hereinafter), such as a media content provider, a DVD/video rental service, etc. which communicates with a plurality of user client devices 12 (the users of which are customers of the particular service provider), as well as with the server 11 through the communication network 13. In this embodiment of the item recommender system 10, the user ratings are sent to the server 11 from the user's client device 12 indirectly, through the SP client devices 12' that continuously collect the ratings from the users and periodically forward the collected user ratings to the server 11. After a scheduled factorization of the available rating matrix, the server 11 sends the updated item feature matrix and selected ones of the updated user feature vectors to an SP client device 12' upon a corresponding request of said SP client device 12'. Based on the updated item feature matrix and the requested user feature vectors, the SP client device 12' generates a predictive rating vector for selected users, and sends a list of items to the client devices 12 of said selected users so as to recommend items to them. This configuration of the item recommendation system is particularly suitable for a video-on-demand network, wherein the server 11 may reside at an external computing center (performing the factorization for a huge number of users and items), whereas at least one SP client device 12' may be operated by a video content provider and the plurality of user client devices 12 may be connected to the SP client device 12' through a video broadcasting network.

In a second aspect, the present invention relates to a server in an item recommender system, the server being adapted to perform factorization of a rating matrix, which is formed of user ratings, into an item feature matrix and a user feature matrix, wherein the server comprises means for receiving a plurality of user ratings, preferably in the form of user rating vectors $r_u$, from a plurality of client devices, means for aggregating said user ratings into a rating matrix R, means for factorizing said rating matrix R into a user feature matrix P and an item feature matrix Q using the above specified ALS1 or IALS1 factorization algorithms in accordance with the invention, and means for transmitting said item feature matrix Q to at least one client device.

Such a server may be typically used, for example, for a movie recommender service in an IPTV network as described above.

The foregoing means of the server are preferably implemented by software tools, typically by computer program routines that can be run on a general-purpose processor or any application-specific processor. The software implementiation of these means is a routine work for a skilled person on the basis of the above specified algorithms and pseudo codes, and therefore such implemenatation details are omitted here.

Preferred Embodiments of the Method

In a third aspect, the present invention further relates to various methods of performing item recommendation in any one of the above specified item recommender systems.

The item recommendation methods according to the invention incorporate the above described ALS1 or IALS1 algorithms so as to reduce computational complexity, and thus the run time of the factorization of a rating matrix.

When the factorization is performed at the server of an item recommendation system, the significant reduction of the computational complexity of the factorizing algorithm allows to perform the rating matrix factorization at a much higher frequency than it was achievable in the prior art item recommendation systems. Consequently, an updated item feature matrix and corresponding user feature vectors may be generated and sent to the client devices at a much higher frequency, therefore it is not necessary to generate an updated user feature vector in a client device any longer from a recent user rating vector and a relatively old item feature matrix by an additional factorization as applied in the prior art. Instead, both of the item feature matrix and the corresponding user feature vectors (i.e. columns of the user feature matrix resulted from the factorization at the server side) may be transmitted to the client devices at a much higher frequency, and any client device can generate its predicitive rating vector by a simple multiplication of the item feature matrix and the respective user feature vector, which dramatically reduces the computational power requirements on the client devices.

Alternatively, as mentioned above in connection with the item recommender system according to the invention, the server may also be configured to only collect the user ratings, and then to forward the aggregated rating matrix (or at least a relevant portion thereof) to the client devices for local factorization. In this case, the factorization within the client devices can also be performed with much lower computational efforts to produce either the same quality of item recommendation with much less time, or much higher quality of item recommendation within the same time.

Figure 3A:
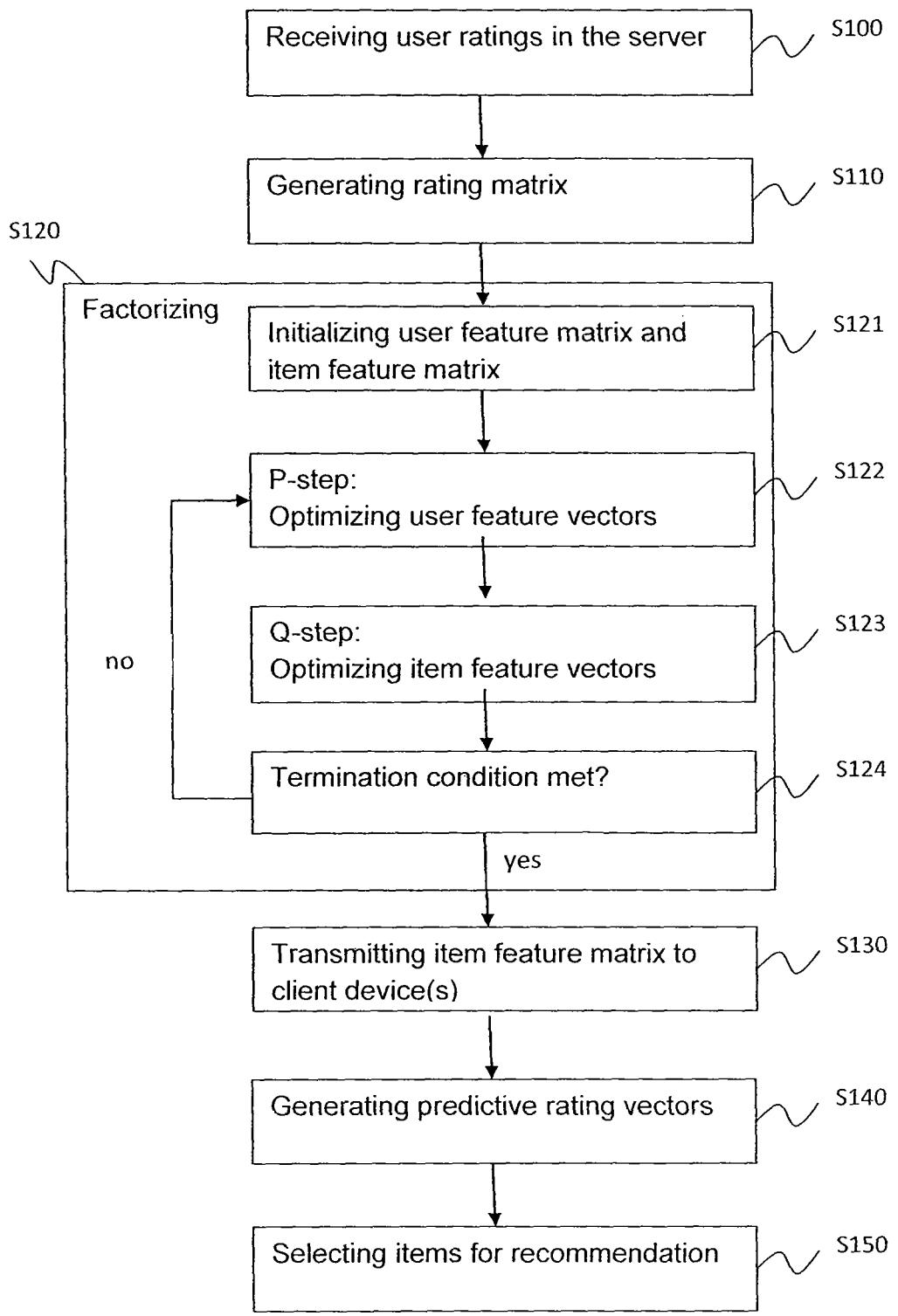
FIG. 3a is a flow diagram illustrating the basic steps of a first item recommending method according to the invention.

Accordingly, the basic steps of the first item recommendation method according to the invention comprises the following steps, also shown in the flow diagram of FIG. 3a.

In the first step S100, a plurality of user ratings, preferably in the form of rating vectors $r_u$, is received by a server from a plurality of client devices. The user rating vectors $r_u$ may include explicit or implicit ratings.

In step 110, the user rating vectors $r_u$ are aggregated by the server into a rating matrix R and in step S120, the server performs the factorization of the rating matrix R into a user feature matrix P and an item feature matrix Q. The factorization is executed periodically in the server, preferably at a predetermined frequency. As a result of the factorization, an approximate rating matrix $\hat{R}$ of said user feature matrix P and said item feature matrix Q is generated that approximates the rating matrix R. The factorization is carried out by using the above mentioned ALS1 and IALS1 factorization algorithms according to the invention, basically including the following steps.

In step S121, the user feature matrix P and the item feature matrix Q are initialized with predefined initial values. In one embodiment of the method, the matrices P and Q are initialized randomly. In a particularly preferred embodiment of the method, however, the matrices P and Q are initialized according to the results of a previous factorization, assuming that only minor changes took place in the rating matrix R within the period between the previous factorization and the actual factorization. If this is the case, it has been experienced that such an initialization of P and Q results in a lower number of epochs of the factorization, thus further reducing the computation time of the factorization. Then in steps S122 and S123, the user feature matrix P and the item feature matrix Q, respectively, are alternately optimized until a termination condition is met in step S124. The termination condition is predefined according to the desired accuracy of the prediction model that is calculated on the basis of certain criteria. It is preferred that for the ALS1 and IALS1 algorithms according to the invention, the well-known RMSE or the ARP measures may be used as performance measures. For a person skilled in the art, however, it is obvious that for defining a termination condition, any other performance measure can also be used depending on the particular field of application of the item recommendation method.

For example, the above mentioned termination condition may include, inter alia, any of the following criteria:
- the number of times that steps S122 and S123 were invoked, i.e. the number of factorization epochs, exceeds a preset limit;
- there is no further reasonable improvement in the performance of the prediction model;
- the performance has reached a preset limit (i.e. the prediction model is regarded good enough);
- the running time of the algorithm exceeds a certain preset limit.

If in step S124, it is determined that the termination condition is not met and therefore a further optimization of the matrices P and Q are needed, the method returns to step S122, otherwise the factorization stops and the method proceeds with step S130, in which the server transmits the updated item feature matrix Q to at least one client device for generating, in step S140, a predictive rating vector $\hat{r}_u$ as a product of an associated user feature vector $p_u$ and the item feature matrix Q, i.e. $\hat{r}_u = Qp_u$. In practice, however, it is preferred that the item feature matrix Q is sent from the server to every client device. Furthermore, in addition to the item feature matrix Q, the corresponding user feature vector $p_u$ of the updated user feature matrix P may also be sent to the client devices.

Finally, in step S150, a portion of the items are selected in the client devices for recommendation on the basis of the predictive rating vectors $\hat{r}_u$.

Figure 3B:
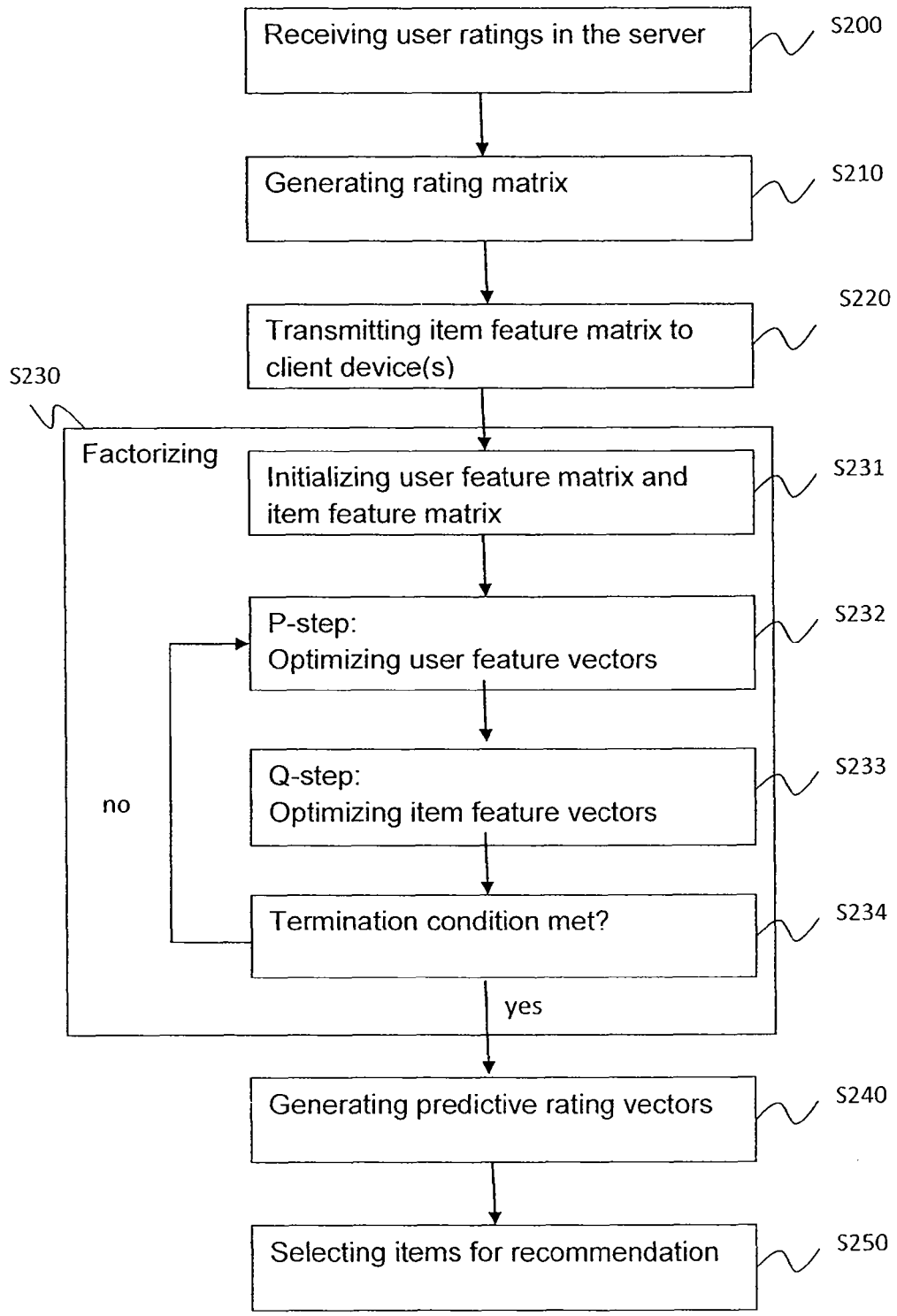
FIG. 3b is a flow diagram illustrating the basic steps of a second item recommending method according to the invention.

Alternatively, in the second item recommendation method according to the invention, the basic steps of which are depicted in FIG. 3b, after receiving the user ratings by the server in step S200 and generating the rating matrix R in the server in step S210, the factorization is performed in the client devices. To this end, in step S220, the aggregated rating matrix R is transmitted to at least one client device, but preferably every client device, to perform the factorization locally in step S230 to produce an updated item feature matrix Q and an updated user feature matrix R. In this embodiment, the factorization and the production of the predictive rating vector $\hat{r}_u$ are performed in the same way as in the foregoing first embodiment of the method. Accordingly, in step S231 the item feature matrix and the user feature matrix are initialized, then in steps S232 and S233, the user feature vectors and the item feature vectors, respectively, are optimized using the ALS1 and IALS1 algorithms, and in step S234, it is checked whether or not the termination condition of the optimization loop is met. When the optimization routine has finished, the method proceeds with step S240 in which the a predictive rating vector $\hat{r}_u$ is generated and finally, in step S250, a portion of the items are selected in the client devices for recommendation on the basis of the predictive rating vectors $\hat{r}_u$.

In a preferred embodiment of the methods according to the invention, the client device may select, according to a predefined selection scheme, a plurality of items from the entire set of items included in the predictive rating vector $\hat{r}_u$ for the recommendation thereof to said particular user u associated with the predictive rating vector $\hat{r}_u$. For the selection of the particular items to be recommended to a user, several specific selection schemes may be used. One of the best schemes is based on the Euclidean distances between the user feature vector and the item feature vectors. Such a selection scheme will be described in detail below.

Using the Euclidean Distance for Item Selection

The simplest way of using the matrix factorization for item recommendation to user u is as follows: after the matrix factorization, the rating matrix R is factorized into a user feature matrix P and an item feature matrix Q. Recall that $p_u$ denotes the u-th row of P, the user feature vector of user u. By computing the matrix-vector product $Qp_u$, we get an estimation on the u-th row of R (the transpose of this vector is denoted by $\hat{r}_u$), or in other words: we get an estimation of how the user is going to like the items (assuming that larger numbers in R means better preference). In the computation of $Qp_u$, the user feature vector $p_u$ is multiplied with each item feature vector $q_i$, recall that $\hat{r}_{ui} = p_u^T q_i$. Now we show that we can transform the user feature vectors $p_u$-s and item feature vectors $q_i$-s into $p'_u$-s and $q'_i$-s such that $\hat{r}'_{ui} = (p'_u - q'_i)^T (p'_u - q'_i)$ is equal $C - p_u^T q_i$, where C is a carefully chosen predefined constant. Note that $\hat{r}'_{ui}$ is the squared Euclidean distance between vectors $p'_u$ and $q'_i$. Using $\hat{r}_{ui}=p_u^T q_i$, the goal is to find such i items for user u that maximize $\hat{r}_{ui}$. When using $\hat{r}'_{ui}=(p'_u-q'_i)^T(p'_u-q'_i)$, the goal is to find such $q'_i$ items that are the nearest neighbors of the feature vector of user u, i.e. the goal is to find items for user u that minimize $\hat{r}'_{ui}$. If there is a transformation of $p_u$ and $q_i$ into $p'_u$ and $q'_i$ such that $\hat{r}'_{ui}$ is equal to $C-p_u^T q_i$, then for user u exactly that item will maximize $\hat{r}_{ui}$, which minimizes $\hat{r}'_{ui}$. This also holds for the second best item, and so on. Thus no matter whether we are finding items with the largest $\hat{r}_{ui}$ value, or with the lowest $\hat{r}'_{ui}$ value, the item recommendations will be exactly the same. Now we show such a transformation:

Let $$p'_u = \frac{1}{\sqrt{2}}\left[p_u; \sqrt{C-p_u^T p_u}; 0\right] \text{ and}$$

$$q'_i = \frac{1}{\sqrt{2}}\left[q_i; 0; \sqrt{C-q_i^T q_i}\right].$$

Here the semicolon operator means vector concatenation, that is both $p'_u$ and $q'_i$ are elements of $R^{K+2}$, since we added two extra dimensions to both $p_u$ and $q_i$. The variable C should be set "large enough", so that the square root will never be negative, but the choice is arbitrary. For example, let $C=\max(\{p_u^T p_u: 1\leq u\leq N\}\cup\{q_i^T q_i: 1\leq i\leq M\})$. Note that $$p'^T_u q'_i = \frac{p_u^T q_i}{2},$$

that is the scalar product is "almost" unchanged.

If we compute $\hat{r}'_{ui}=(p'_u-q'_i)^T(p'_u-q'_i)$, it yields $p'^T_u p'_u + q'^T_i q'_i - 2p'^T_u q'_i$. Now substituting the definition of $p'_u$ and $q'_i$, it yields: $(p_u^T p_u + C - p_u^T p_u + q_i^T q_i + C - q_i^T q_i - 2p_u^T q_i)/2$, which simplifies into $C-p_u^T q_i$, which was to be demonstrated.

The advantage of using this representation is that there is a huge literature about finding quickly the nearest neighbors of a vector. All of this literature can be applied here to speed up recommendations, which can be advantageous especially when there is a huge number of items.

In a preferred embodiment of the item recommendation methods, the factorization of the rating matrix R into a user feature matrix P and an item feature matrix Q may be performed at two stages, including a preliminary first approximation of the rating matrix, and then a final, more accurate approximation thereof, both at the server. To this end, a first user feature matrix $P_1$ and a first item feature matrix $Q_1$ are generated by using a first number of latent factors $K_1$ for the preliminary factorization, thereby a first (preliminary) estimation of the rating matrix R is obtained. A second user feature matrix $P_2$ and a second item feature matrix $Q_2$ are generated by using a second number of latent factors $K_2$, wherein $K_1<K_2$. The first item feature matrix $Q_1$ and selected rows of the first user feature matrix $P_1$ may be transmitted to the plurality of client devices. On the basis of the appropriate row of first user feature matrix $P_1$ corresponding to the user for whom the item recommendation is going to be generated, and the first item feature matrix $Q_1$ thus obtained, a first item list including $N_1$ number of items are defined in the client device. This list may then be transmitted from the client devices to the server, where predictions are generated for these $N_1$ items according to the second factorization (using $P_2$ and $Q_2$), using the $\hat{r}_{ui}=p_u^T q_i$ formula, where $p_u$ now denotes the u-th row of $P_2$ and $q_i$ now denotes the i-th row of $Q_2$. Thus a second, final estimation of a subset of the rating matrix R is produced.

After the computation of these $\hat{r}_{ui}$ values, the server may send back the result, and the client devices can select a reduced $N_2$ number of items from the first list of $N_1$ items according to a predefined selection scheme for the recommendations thereof to a user. The selection of $N_2$ number of items from the first list of $N_2$ items may also be performed by the server, in this case the selected $N_2$ number of items are returned by the server.

In a fourth aspect, the present invention relates to a computer program product for providing personalized item recommendations to a plurality of users. The computer program product comprises a computer-readable medium having a plurality of computer program instructions stored therein, which are operable to cause at least one server and a plurality of client devices to carry out the respective steps of the item recommendation methods according to the invention.

EXPERIMENTS

We evaluated the ALS1 algorithm on the Netflix Prize (NP) dataset described in J. Bennett and S. Lanning, "The Netflix Prize" (*KDD Cup Workshop at KDD-07*, 13*th* *ACM Int. Conf. on Knowledge Discovery and Data Mining*, pages 3 to 6, San Jose, Calif., USA, 2007) and the IALS1 algorithm on a proprietary dataset of one of our customers.

The NP dataset contains 100 480 507 ratings (i.e. (u, i, $r_1$ui) triplets) of 480 189 users on 17 770 movies, on a 1 to 5 integer scale. Ratings are provided as a standard train-test split. The test set contains 1 408 395 ratings and is called Probe and contains newer ratings for each user than the Train. In our experiments we used our Probe10 set (available at the applicant's homepage, http://www.gravityrd.com) that contains only a $$\frac{1}{10}$$

subset of the Probe ratings (140 840 ratings), and puts the rest of Probe into Train. Probe10 approximates very well the withheld Quiz set described in G. Takács, I. Pilászy, B. Németh, and D. Tikk "Scalable collaborative filtering approaches for large recommender systems" (*Journal of Machine Learning Research*, 10:623-656, 2009), in the sense that predictors evaluated on both produce very similar results; the difference is almost always less than 2 bps (1 bps=0.0001 RMSE); due to this Probe10 has been also used by others in the NP community. Before experimentation, we subtracted the global mean, 3.6043, from all ratings.

All experiments were performed on an Intel Core2 Quad Q9300 cpu on 2.5 GHz, using only 1 core.

Netflix Prize Dataset

We evaluated the ALS and the ALS1 algorithms on the Netflix Prize dataset, optimizing the following cost function:

$$\sum_{(u,i)\in\mathcal{R}} \left((p_u^T q_i - r_{ui})^2 + \lambda^{(p)} p_u^T p_u + \lambda^{(q)} q_i^T q_i\right),$$

where $\lambda^{(p)}=2$ and $\lambda^{(1)}=0.001$, and we restricted the first column of P and the second column of Q to be 1.

We varied the number of features, K, and measured the RMSE on the test set after each epoch. Table 2 summarizes the results after 10 and 25 epochs. We also report the time needed to train the model. The RMSE of ALS and ALS1 are more similar after 25 than after 10 epochs: the largest difference is only 4 bps. However, ALS1 requires much less time for training: as K grows, the gap becomes larger. For the typical choice of K=50, the training with ALS1 for 25 epochs requires less than an hour, while ALS needs more than 7 hours. When K is 100, ALS1 is already 17 times faster. We were further able to run ALS1 with K=1000 faster than ALS with K=100.

From these tables we can conclude, that on the Netflix Prize dataset, ALS1 is about an order of magnitude faster than ALS at the usual K values, while offering almost the same RMSE. On the other hand if that small difference in RMSE matters, we can run ALS1 with somewhat more factors to catch up with the accuracy of ALS.

TABLE 2

Probe10 RMSE of ALS and ALS1 on the Netflix dataset, after 10 and 25 epochs and the same K.

| | ALS | | ALS1 | |
|---|---|---|---|---|
| K | RMSE | time | RMSE | time |
| (10 epoch) | | | | |
| 5 | 0.9391 | 389 | 0.9394 | 305 |
| 10 | 0.9268 | 826 | 0.9281 | 437 |
| 20 | 0.9204 | 2288 | 0.9222 | 672 |
| 50 | 0.9146 | 10773 | 0.9154 | 1388 |
| 100 | 0.9091 | 45513 | 0.9098 | 2653 |
| 200 | 0.9050 | 228 981 | 0.9058 | 6308 |
| 500 | 0.9027 | 2 007 451 | 0.9032 | 22070 |
| 1000 | N/A | N/A | 0.9025 | 44345 |
| (25 epoch) | | | | |
| 5 | 0.9386 | 980 | 0.9390 | 764 |
| 10 | 0.9259 | 2101 | 0.9262 | 1094 |
| 20 | 0.9192 | 5741 | 0.9196 | 1682 |
| 50 | 0.9130 | 27500 | 0.9134 | 3455 |
| 100 | 0.9078 | 115 827 | 0.9079 | 6622 |
| 200 | 0.9040 | 583 445 | 0.9041 | 15836 |
| 500 | 0.9022* | 4 050 675* | 0.9021 | 55054 |
| 1000 | N/A | N/A | 0.9018 | 110 904 |

Training times are given in seconds
*ran only for 20 epochs

Figure 4:
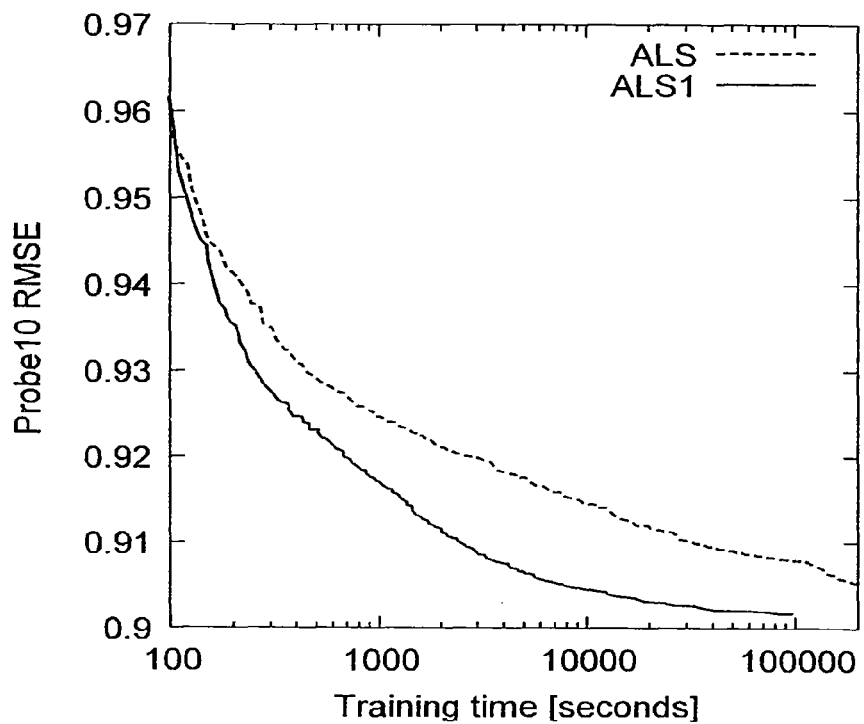
FIG. 4 is a graph depicting measurement results for the ALS and the ALS1 algorithms.

FIG. 4 shows the results measured in each epoch. We depicted only the best RMSE results achieved with both ALS and ALS1 under the same amount of time, independently from the number of epochs and the value of K. Both obtained curves are monotone decreasing. The curve of ALS1 is always under ALS which means that:

ALS1 can reach the same RMSE as ALS much faster.

ALS1 can reach significantly better RMSE than ALS under the same amount of training time.

Consequently, ALS1 offers a superior trade-off possibility between running time and performance compared to ALS.
RIF Dataset, ARP We performed the evaluation of implicit feedback algorithms on the RIF dataset. We optimized the following cost function:

$$\sum_{(u,i)\in\mathcal{R}_\pm} c_{ui} \cdot (p_u^T q_i - r_{ui})^2 + \lambda_u \sum_{u=1}^N p_u^T p_u + \lambda_i \sum_{i=1}^M q_i^T q_i,$$

where $c_{ui}=1+\alpha \cdot r_{ui}$; $\alpha=2.00$, $\lambda=\lambda_i=1000$.

(The above cost function and further details can be found in Y. Hu, Y. Koren, and C. Volinsky, "Collaborative filtering for implicit feedback datasets", Proc. of ICDM-08, 8th IEEE Int. Conf. on Data Mining, Pisa, Italy, 2008, pages 263 to 272)

We used average relative position (ARP) as the evaluation metric for this implicit feedback dataset, which is defined as follows.

For a given user u in the test set, the recommendation algorithm has to order all the recommendable items. This ordering can be based on the $\hat{r}_{ui}\in R$ prediction values: items with highest $\hat{r}_{ui}$ are ranked first. For user u, the set of items are divided into two parts: relevant and non-relevant ones for the user. Assume that the recommendable items are indexed by i ranging from 1 to M. Let $r_{ui}\in\{0,1\}$ denote whether an item is relevant to the user or not, e.g. user will view that item during the test period or not. Then the position for item i relevant to user u is defined as:

$$pos_{ui}=|\{j:r_{uj}=0 \wedge \hat{r}_{uj}>\hat{r}_{ui}\}|$$

The relative position is defined as:

$$rpos_{ui} = \frac{pos_{ui}}{|\{j: r_{uj} = 0\}|}$$

For example, if we have 103 items, only 3 of them (indexed by 1, 2 and 3) are relevant for user u, and the ranking algorithm puts them at the 1st, 20th and 54th position, then the relative positions are $$rpos_{u1} = \frac{1}{100}, rpos_{u2} = \frac{20}{100} \text{ and } rpos_{u3} = \frac{54}{100}.$$

This is a normalized measure.
The average relative position is defined as:

$$ARP = \frac{\sum_{(u,i)\in\mathcal{R}} rpos_{ui}}{|\mathcal{R}|}, \quad (14)$$

where the summation is taken over each positive implicit feedback of the test period. We remark that during training, each positive implicit feedback of the test set (i.e. $r_{ui}=2$) must be considered as it would be negative implicit feedback (i.e. $r_{ui}=0$) to avoid information leakage. We remark that a very similar measure was proposed in [7, 8], indeed ARP can be seen as the formal definition of the rank measure proposed in these works.

We experimented on the RIF dataset with various K values to compare the performance of IALS and IALS1 algorithms.

TABLE 3

ARP of IALS and IALS1 with different number of factors on the RIF dataset, after 10 (upper) and 20 (lower) epochs.

| | IALS | | IALS1 | |
|---|---|---|---|---|
| K | ARP | time | ARP | time |
| (10 epoch) | | | | |
| 5 | 0.1903 | 76 | 0.1890 | 56 |
| 10 | 0.1584 | 127 | 0.1598 | 67 |
| 20 | 0.1429 | 322 | 0.1453 | 104 |
| 50 | 0.1342 | 1431 | 0.1366 | 262 |

TABLE 3-continued

ARP of IALS and IALS1 with different number of factors on
the RIF dataset, after 10 (upper) and 20 (lower) epochs.

| | IALS | | IALS1 | |
|---|---|---|---|---|
| K | ARP | time | ARP | time |
| 100 | 0.1328 | 5720 | 0.1348 | 680 |
| 250 | 0.1316 | 46472 | 0.1329 | 3325 |
| 500 | 0.1282 | 244 088 | 0.1298 | 12348 |
| 1000 | N/A | N/A | 0.1259 | 52305 |
| | | (20 epoch) | | |
| 5 | 0.1903 | 153 | 0.1898 | 112 |
| 10 | 0.1578 | 254 | 0.1588 | 134 |
| 20 | 0.1427 | 644 | 0.1432 | 209 |
| 50 | 0.1334 | 2862 | 0.1344 | 525 |
| 100 | 0.1314 | 11441 | 0.1325 | 1361 |
| 250 | 0.1313 | 92944 | 0.1311 | 6651 |
| 500 | N/A | N/A | 0.1282 | 24697 |
| 1000 | N/A | N/A | 0.1242 | 104 611 |

Reported times are in seconds.

Table 3 above contains comparative results of the evaluation after 10 and 20 epochs. With increasing K the difference between the training time of IALS and IALS1 gets larger. When K is 100, IALS1 is 10 times faster than IALS. When we compare results of IALS to the results of IALS1 on the next K values (at 20 epochs), we can see that IALS1 is both faster and more accurate in these comparisons, especially when K is large. For example, IALS1 with K=500 can reach better performance in a shorter time than IALS with K=250.

Figure 5:
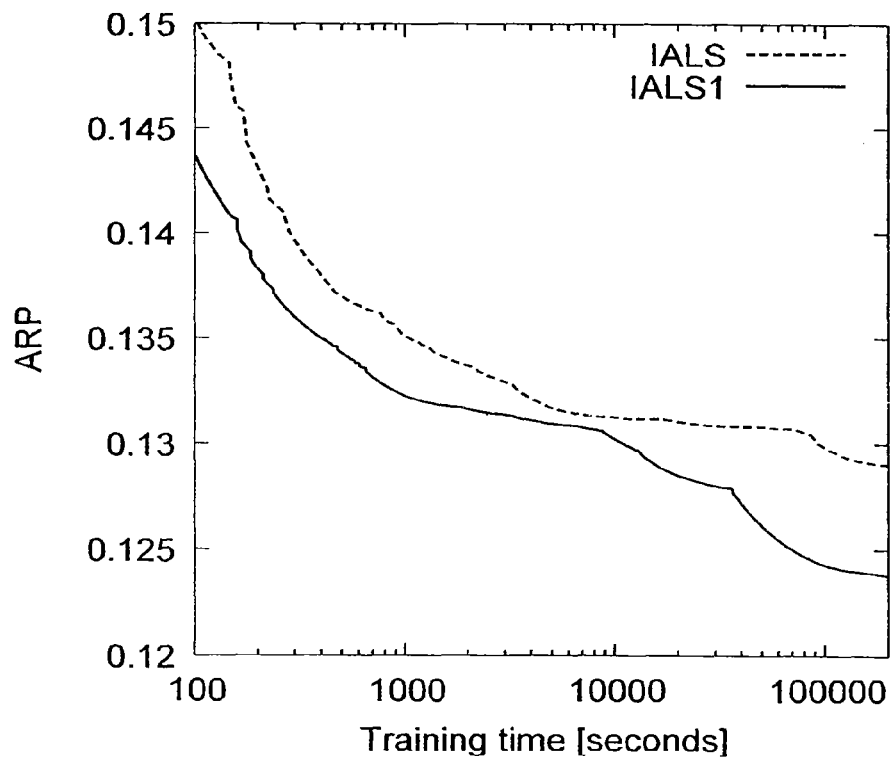
FIG. 5 is a graph depicting measurement results for the IALS and the IALS1 algorithms.

FIG. 5 compares the time-accuracy trade-off of the two algorithms. We used the same consideration to depict the curves as for FIG. 1. The curve of IALS1 is always located under IALS, so we can draw similar conclusions as before, i.e. IALS1 offers superior trade-off possibility between running time and performance compared to IALS.

The curves of IALS1 and IALS have similar characteristics: steep start, flat in the middle, and gets steep again at the end. When examining the curves from left to right, both curves reach a point when their gradient decreases and then the two curves become closer. Usually the ARP is better for larger K values. However, in the range of K=100-300 (on the time scale between 2000 and 20000 seconds) this does not hold (the flat middle), and consequently the two curves get close to each other.

Other Fields of Application of the ALS1 and IALS1 Methods

Although in the foregoing, the enhanced factorization algorithms, i.e. the ALS1 and IALS1 algorithms, according to the invention have been described in relation with electronic item recommendation, these factorization algorithms may equally be applied in various other information processing areas (e.g. for data mining, for text mining or even for image processing) and in different business domains (e.g. for content and application recommendation in interactive TV, for recommendations in e-commerce stores/auction portals/internet market places, for digital media & streaming, for online dating, for targeted advertisements and for streamlined direct marketing based on CRM databases) with the advantages as discussed above. Additionally, some typical application of the proposed factorization algorithms will now be introduced briefly as non-limiting examples.

1. In particular, in many data mining problems relations between the object groups are represented with matrices or tensors (for multi dimensional case). Our solution can be applied efficiently to all these problems, especially when the object groups have many elements, thus the resulting matrix is very large.

2. In the field of text mining, usually there are a huge number of documents to be processed. The content of these documents can be converted into a so-called term-document matrix. An example of the construction of this matrix is as follows: each row corresponds to a word of the vocabulary, each column corresponds to a document, and an element of the matrix tells how many times a given word occurs in a given document. Usually this matrix is modified (e.g. the rows or columns are normalized, etc.). This matrix can then be analyzed by matrix factorization algorithms. For example, Singular Value Decomposition (SVD, a well known matrix factorization algorithm) was applied to the term-document matrix in 1990 (S. Deerwester: Indexing by Latent Semantic Analysis). Since the ALS1 and IALS1 algorithms in accordance with the present invention are very fast, they can be applied to analyze huge term-document matrices.

3. In the field of image processing, there are two common possibilities for the application of matrix factorization algorithms.

(a) Each digitized image can be represented as a matrix. For example, grey shaded digitized images can be represented in the following way: rows of the matrix correspond to the rows of the image, columns of the matrix correspond to the columns of the image, and the numerically represented grey-level can be put in the appropriate cell of the matrix. Then, matrix factorization can be applied on such a matrix. See, e.g. http://www.netflixprize.com/community/viewtopic.php?id=517, where matrix factorization is applied to reconstruct missing pixels of an image. Since the ALS1 and IALS1 algorithms in accordance with the present invention are matrix factorization algorithms, they are equally applicable in this domain.

(b) Factorization on a collection of images. Each image represented as a matrix can be converted into a column vector by concatenating the consecutive columns of the matrix, forming a very long column vector. (In this way the structure of the image is lost, however). If multiple images of the same size are provided, a single matrix can be created therefrom: first, we convert each image to a matrix, then we convert these matrices into column vectors, and then we can put these column vectors next to each other, thereby forming a matrix. Matrix factorization can then be applied to such a matrix to analyze common properties of these images. This is commonly used for example in face recognition. Since our ALS1 and IALS1 algorithms are efficient matrix factorization algorithms, they are applicable in this domain as well.

4. In the field of content and application recommendation in interactive TV, there are currently hundreds of channels, thousands of video on demand content, music, games, interactive applications, etc. in modern digital TV environment. By nature, there are limited visualization and navigation possibilities to find the right content for the right audience. The present solution seamlessly collects the user preferences information and provides relevant recommendation to the end user. The proposed robust algorithms are necessary to process, as operators have several million users and hundred thousands of available content.

5. E-commerce stores differ from normal, everyday shopping; there are provided e.g. limited display capabilities, less "enjoyment factor" (e.g. bookstore effect), etc. An efficient product recommendation in e-commerce stores/auction portals/internet market places offers faster product discovery, personal shopping experience to the end-user, increased revenue, optimized one-to-one merchandising options, inventory usage. Products can be any consumer goods, food, media (music, mp3, dvd), etc. to mention only a few non-limiting examples. Offerings can be places, events (collectively venue recommendations), and ticketing as well.

6. The present invention can be also exploited in the field of digital media & streaming. Internet became the new interactive TV platform. More people consume content/programs on Internet than on TV (e.g. YouTube, Hulu, Last.fm). Our solution helps similarly the content discovery such as in the case of Interactive TV. The recommendable program set can be any kind of video/audio or mixed, can be live or recorded (e.g. YouTube, music sites, Ustream—live streaming, web cam sites, etc.).

7. In the field of online dating, the detailed preference and behavior analysis can much improve the matchmaking process.

8. When targeted advertisements are considered, advertisers' key objective is to find deliver and present the most efficiently the ad campaigns (the marketing message). The better they can define the target group and deliver them the ads, the better the budget is used. Based on the user's behavior information, preference profiles can be constructed, and ads can be more accurately targeted with our solutions.

9. In the case of streamlined direct marketing based on CRM (customer relation management) databases, a corporate CRM system stores all kinds of transactional data. After detailed processing of the data, important customer patterns and preferences can be derived. These pieces of information can lead to offer better service/product/package offerings on the various direct marketing channels (newsletter, SMS, call center, personal sales assistant, etc.)

In the above mentioned (and any other possible) applications of the ALS1 and IALS1 methods, it is obvious for a skilled person how to specifically implement the methods in a computer system or network on the basis of the specific details (equations, pseudo codes, references, etc.) introduced in this specification.

Although the present invention has been described in detail for the purpose of illustration, various variations and modifications of the invention as disclosed, in addition to those described herein, will become apparent to those of skill in the art from the foregoing description. Such variations and modifications are intended to be encompassed within the scope of the present application.

What is claimed is:

1. A method of providing personalized item recommendations in a communication system comprising a server and a plurality of client devices, the method comprising
   at the server, receiving a plurality of user rating vectors $r_u$ from a plurality of said client devices,
   at the server, aggregating the user rating vectors $r_u$ into a rating matrix R,
   at the server, factorizing said rating matrix R into a user feature matrix P and an item feature matrix Q, wherein the product $\hat{R}$ of said user feature matrix P and said item feature matrix Q approximates the user rating matrix R, said factorization comprising the steps of either the ALS1 or the IALS1 algorithm presented in this patent application, namely:
      initializing said user feature matrix P and said item feature matrix Q with predefined initial values,
      alternately optimizing said user feature matrix P and said item feature matrix Q until a termination condition is met, wherein
      (i) in a P-step, a cost function
      $$F(p_u) = \lambda p_u^T p_u + \sum_{i=1}^{M} c_{ui}(p_u^T q_i - r_{ui})^2$$
      is minimized for each user feature vector $P_u$ of said user feature matrix P with a fixed item feature matrix Q, and
      (ii) in a Q-step, a cost function
      $$F(q_i) = \lambda q_i^T q_i + \sum_{i=1}^{N} c_{ui}(p_u^T q_i - r_{ui})^2$$
      is minimized for each item feature vector $q_i$ of said item feature matrix Q with a fixed user feature matrix P,
      wherein $\lambda$ is a preset regularization factor, $c_{ui}$ is a confidence value with respect to user u and item i, and $r_{ui}$ is the rating value for an item i evaluated by a user u,
      wherein in each of the P-steps, each scalar element of Pu is computed from all other scalar elements of $P_u$ and the fixed matrix Q, and similarly, in each of the Q-steps, each scalar element of $q_i$, is computed from all other scalar elements of qi and the fixed matrix P, and,
   transmitting, from the server, said item feature matrix Q to at least one client device,
   generating a predictive rating vector $\hat{r}_u$ as the product of the associated user feature vector $P_u$ and the item feature matrix Q, and
   by using a predefined selection scheme, selecting at least one item for recommendation to user from the items associated with the predictive rating vector $\hat{r}_u$.

2. The method of claim 1, wherein the ALS1 or IALS1 algorithms are applied, but any approximate ridge regression solver is used instead of the RR1 algorithm.

3. The method of claim 1, wherein the ALS1 or IALS1 algorithms are applied, but any approximate ridge regression solver being able to exploit the previously computed values is used instead of the RR1 algorithm.

4. The method of claim 1, wherein the ALS1 or IALS1 algorithms are applied, but any ridge regression solver being able to exploit the previously computed values is used instead of the RR1 algorithm.

5. The method of claim 1, wherein the Pu user feature vector associated with the client device is transmitted to the client device.

6. The method of claim 1, wherein in the step of predictive rating vector generation and the step of item selection, the method further comprises, at a client device, according to a predefined selection scheme, selecting a plurality of items from the entire set of items included in the predictive rating vector $\hat{r}_u$ for the recommendation thereof to said particular user u associated with the predictive rating vector $\hat{r}_u$.

7. The method of claim 1, wherein the said rating matrix R is transmitted from the server to one or more clients, and the factorization of the R matrix and the additional steps are performed by the client devices.

8. The method of claim 7, wherein the said rating matrix R is multiplied by a matrix X from left or right, and then the result of that said matrix multiplication and the X matrix are transmitted to the client devices.

9. The method of claim 7, wherein only a submatrix of the matrix R is sent to the client devices.

10. The method of claim 9, wherein different submatrices of the matrix R are sent to the client devices.

11. The method of claim 10, wherein the submatrices being sent to the client devices are chosen carefully, in order to ensure that each client device will get those parts of the matrix R which has the most predictive power for that client device.

12. The method of claim 1, wherein not the whole item feature matrix Q is transmitted to the client device, but only a selected subset of the rows of the Q matrix.

13. The method of claim 12, wherein those rows of the Q matrix are transmitted to the client device for which the corresponding items are likely to get high prediction value with respect to the user or users associated with the client device.

14. The method of claim 1, wherein said user rating vectors $r_u$ include explicit ratings provided by a plurality of users with respect to a plurality of items.

15. The method of claim 1, wherein said user rating vectors $r_u$ include implicit ratings provided by a plurality of users with respect to a plurality of items.

16. The method of claim 1, wherein for each negative implicit user rating, said confidence value $c_{ui}$ is set to 1 and said user rating value $r_{ui}$ is set to 0.

17. The method of claim 1, wherein for each negative implicit user rating, said confidence value $c_{ui}$ is set to 0.5 and said user rating value $r_{ui}$ is set to 0.5.

18. The method of claim 1, wherein the user feature matrix P and the item feature matrix Q are initialized randomly.

19. The method of claim 1, wherein the user feature matrix P and the item feature matrix Q are initialized according to the result of a previous factorization.

20. The method of claim 1, wherein in the IALS1 algorithm the matrix $A_0$ and the vector $d_0$ are initialized differently compared to the original approach (in the original version they are initialized with $$A_0 = \sum_i \Box c_0 \cdot q_i q_i^T, d_0 = \sum_i \Box c_0 \cdot r_0 \cdot q_i.$$

21. The method of claim 20, wherein the matrix $A_0$ and the vector $d_0$ are initialized in each P-step or Q-step differently.

22. The method of claim 20, wherein the matrix $A_0$ and the vector $d_0$ are initialized in each P-step or Q-step differently such that a target function is approximately minimized or maximized.

23. The method of claim 22, wherein the matrix $A_0$ and the vector $d_0$ are chosen so as to minimize ARP on a hold-out set.

24. The method of claim 22, wherein the matrix $A_0$ and the vector $d_0$ are initialized but items or users with less than a specific number of feedbacks are excluded from the summation.

25. The method of claim 1, wherein in the IALS1 algorithm the combination of negative implicit feedback cancellation examples and positive implicit feedbacks into a $$\frac{-c_0 r_0 + c_{ui} r_{ui}}{-c_0 + c_{ui}}$$

rating with I $c_0+c_{ui}$ confidence is replaced with a $r_{ui}$ rating with $c_{ui}$ confidence.

26. The method of any one of claim 1, wherein the step of factorizing said rating matrix R comprises generating a first user feature matrix $P_1$ and a first item feature matrix $Q_1$ by using a first number of latent factors $K_1$, thereby obtaining a first estimation of the rating matrix R, generating a second user feature matrix $P_2$ and a second item feature matrix $Q_2$ with respect to said using a second number of latent factors $K_2$, wherein $K_1 < K_2$, on the basis of said first user feature matrix $P_1$ and said first item feature matrix $Q_1$, generating a first item list including $N_1$ number of items, and on the basis of said second feature matrices $P_2$ and $Q_2$, selecting $N_2$ number of items from the first list of $N_1$ items for recommendation to a user, wherein $N_2 < N_1$.

27. The method of claim 26, wherein the generation of the first $N_1$ number of items is performed by the client, then the client sends this list to the server, and then a second list of $N_2$ number of items is sent by the server to the client.

28. The method of claim 27, wherein the second $N_2$ number of items are chosen from the first $N_1$ number of items.

29. The method of claim 27, wherein the server computes the predicted rating values for the $N_1$ number of items, and these $N_1$ number of prediction values are sent to the client.

30. The method of claim 1, wherein after the step of factorizing said rating matrix R into P and Q, computing $$p'_u = \frac{1}{\sqrt{2}} \left[ p_u; \sqrt{C - p_u^T p_u}; 0 \right]$$

user feature vectors and $$q'_i = \frac{1}{\sqrt{2}} \left[ q_i; 0; \sqrt{C - q_i^T q_i} \right]$$

item feature vectors from the $P_u$ user feature vectors and $q_i$ item feature vectors, and using the formula $\hat{r}'_{ui}=(p'_u-q'_i)^T(p'_u-q'_i)$ or $\hat{r}'_{ui}=C-(p'_u-q'_i)^T(p'_u-q'_i)$ instead of $\hat{r}_{ui}=p_u^T q_i$.

31. The method of claim 30, wherein: whenever a minimum of $\hat{r}'_{ui}$ is to be found according to i or u, then any algorithm can be used which aims at speeding up the finding of nearest neighbors.

32. The method of claim 30, wherein the minimization or maximization of $\hat{r}'_{ui}$ according to i or u is performed by the kd-tree algorithm.

33. The method of claim 26, wherein the result of the first factorization step is utilized in computing $$p'_u = \frac{1}{\sqrt{2}} \left[ p_u; \sqrt{C - p_u^T p_u}; 0 \right]$$

user feature vectors and $$q'_i = \frac{1}{\sqrt{2}} \left[ q_i; 0; \sqrt{C - q_i^T q_i} \right]$$

item feature vectors from the $P_u$ user feature vectors and $q_i$ item feature vectors, and using the formula $\hat{r}'_{ui}=(p'_u-q'_i)^T(p'_u-q'_i)$ or $\hat{r}'_{ui}=C-(p'_u-q'_i)^T(p_u'-q'_i)$ instead of $\hat{r}_{ui}=p_u^T q_i$, and the said $N_1$ number of items are chosen according to $\hat{r}'_{ui}$.

34. A method of providing personalized item recommendations in a communication system comprising a server and a plurality of client devices, the method comprising
- at the server, receiving a plurality of user rating vectors $r_u$ from a plurality of said client devices,
- at the server, aggregating the user rating vectors $r_u$ into a rating matrix R,
- transmitting, from the server, said rating matrix R to at least one client device,
- at a client device, factorizing said rating matrix R into a user feature matrix P and an item feature matrix Q, wherein the product $\hat{R}$ of said user feature matrix P and said item feature matrix Q approximates the user rating matrix R, said factorization comprising
  - initializing said user feature matrix P and said item feature matrix Q with predefined initial values,
  - alternately optimizing said user feature matrix P and said item feature matrix Q until a termination condition is met, wherein
    - (i) in a P-step, a cost function $$F(p_u) = \lambda p_u^T p_u + \sum_{i=1}^{M} \Box c_{ui}(p_u^T q_i - r_{ui})^2$$

is minimized for each user feature vector $P_u$ of said user feature matrix P with a fixed item feature matrix Q, and
    - (ii) in a Q-step, a cost function $$F(q_i) = \lambda q_i^T q_i + \sum_{i=1}^{N} \Box c_{ui}(p_u^T q_i - r_{ui})^2$$

is minimized for each item feature vector $q_i$ of said item feature matrix Q with a fixed user feature matrix P,
    - wherein $\lambda$ is a preset regularization factor, $c_{ui}$ is a confidence value with respect to user u and item i, and $r_{ui}$ is the rating value for an item i evaluated by a user u, and
    - wherein in each of the P-steps, each scalar element of Pu is computed from all other scalar elements of $P_u$ and the fixed matrix Q, and similarly, in each of the Q-steps, each scalar element of $q_i$, is computed from all other scalar elements of $Q_i$ and the fixed matrix P,
- generating a predictive rating vector $\hat{r}_u$ as the product of the associated user feature vector $P_u$ and the item feature matrix Q, and
- by using a predefined selection scheme, selecting at least one item for recommendation to user from the items associated with the predictive rating vector $\hat{r}_u$.

35. A server for providing personalized item recommendations in a communication system to a plurality of users associated with a plurality of client devices, the server comprising
- means for receiving a plurality of user rating vectors $r_u$ from a plurality of client devices,
- means for aggregating said plurality of user rating vectors $r_u$ into a rating matrix R,
- means for factorizing said rating matrix R into a user feature matrix P and an item feature matrix Q, wherein the product $\hat{R}$ of said user feature matrix P and said item feature matrix Q approximates the user rating matrix R, said factorization comprising
  - initializing said user feature matrix P and said item feature matrix Q with predefined initial values,
  - alternately optimizing said user feature matrix P and said item feature matrix Q until a termination condition is met, wherein
    - (i) in a P-step, a cost function $$F(p_u) = \lambda p_u^T p_u + \sum_{i=1}^{M} \Box c_{ui}(p_u^T q_i - r_{ui})^2$$

is minimized for each user feature vector $P_u$ of said user feature matrix P with a fixed item feature matrix Q, and
    - (ii) in a Q-step, a cost function $$F(q_i) = \lambda q_i^T q_i + \sum_{i=1}^{N} \Box c_{ui}(p_u^T q_i - r_{ui})^2$$

is minimized for each item feature vector $q_i$ of said item feature matrix Q with a fixed user feature matrix P,
    - wherein $\lambda$ is a preset regularization factor, $c_{ui}$ is a confidence value with respect to user u and item i, and $r_{ui}$ is the rating value for an item i evaluated by a user u, and
    - wherein in each of the P-steps, each scalar element of $P_u$ is computed from all other scalar elements of $P_u$ and the fixed matrix Q, and similarly, in each of the Q-steps, each scalar element of $q_i$, is computed from all other scalar elements of $Q_i$ and the fixed matrix P, and
- means for transmitting said item feature matrix Q to at least one client device.

36. A system for providing personalized item recommendations to a plurality of users in a communication system, comprising:
- a server as defined in claim 35, and
- a plurality of client devices, each one of said client devices being adapted for
  - generating a predictive rating vector $\hat{r}_u$, for each selected user u associated with said selected client devices, said predictive rating vector $\hat{r}_u$ being the product of the user feature vector $P_u$ and the item feature matrix Q, and
  - selecting, according to a predefined selection scheme, a plurality of items from the entire set of items included in the predictive rating vector $\hat{r}_u$ for the recommendation thereof to said particular user u associated with the predictive rating vector $\hat{r}_u$, and
- a communication interconnection for interconnecting said server and said client devices.

37. A computer program product for providing personalized item recommendations to a plurality of users, the computer program product comprising a non-transitory computer-readable medium having a plurality of computer program instructions stored therein, which are operable to cause at least one server and a plurality of client devices to carry out the respective steps of the method of claim 1.

* * * * *